(12) United States Patent
Peng

(10) Patent No.: US 11,449,876 B2
(45) Date of Patent: Sep. 20, 2022

(54) METHODS, APPARATUSES, DEVICES, AND SYSTEMS FOR ASSET TRANSFER

(71) Applicant: ALIPAY (HANGZHOU) INFORMATION TECHNOLOGY CO., LTD., Zhejiang (CN)

(72) Inventor: Yujun Peng, Hangzhou (CN)

(73) Assignee: Alipay (Hangzhou) Information Technology Co., Ltd., Zhejiang (CN)

( * ) Notice: Subject to any disclaimer, the term of this patent is extended or adjusted under 35 U.S.C. 154(b) by 0 days.

(21) Appl. No.: 17/246,227

(22) Filed: Apr. 30, 2021

(65) Prior Publication Data

US 2021/0256537 A1 Aug. 19, 2021

(30) Foreign Application Priority Data

May 15, 2020 (CN) .......................... 202010413943.2

(51) Int. Cl.
G06Q 30/00 (2012.01)
G06Q 10/10 (2012.01)
(Continued)

(52) U.S. Cl.
CPC .......... *G06Q 30/018* (2013.01); *G06Q 10/10* (2013.01); *H04L 9/0618* (2013.01); *H04L 9/30* (2013.01);
(Continued)

(58) Field of Classification Search
None
See application file for complete search history.

(56) References Cited

U.S. PATENT DOCUMENTS 10,997,595 B1 * 5/2021 Gross ................. G06Q 20/4014
2018/0365764 A1 * 12/2018 Nelson ................. G06Q 40/025
(Continued)

FOREIGN PATENT DOCUMENTS

CN  108090769  5/2018
CN  109146448  1/2019
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Neha Patel
*Assistant Examiner* — Nicholas K Phan
(74) *Attorney, Agent, or Firm* — Fish & Richardson P.C.

(57) ABSTRACT

Embodiments of the present specification provide methods, apparatuses, devices, and systems for asset transfer. The method includes the following: a blockchain node receives an asset transfer request sent by a first client device; invoking a first smart contract in a blockchain, and locking a to-be-transferred asset based on the first smart contract and asset transfer information included in the asset transfer request; sending asset information of the to-be-transferred asset to a designated trading platform, so that the trading platform determines, based on the asset information, a second user who trades with a first user; obtaining asset transfer confirmation information from the first client device, and performing transfer processing on the locked to-be-transferred asset based on the asset transfer confirmation information, so as to transfer the to-be-transferred asset to the second user, where the asset transfer confirmation information includes information about the second user.

16 Claims, 13 Drawing Sheets

(51) Int. Cl.
  *H04L 9/06* (2006.01)
  *H04L 9/30* (2006.01)
  *H04L 29/06* (2006.01)
  *H04L 9/40* (2022.01)
  *H04L 9/00* (2022.01)

(52) U.S. Cl.
  CPC ..... *H04L 63/0442* (2013.01); *G06Q 2220/10* (2013.01); *H04L 9/50* (2022.05)

(56) References Cited

U.S. PATENT DOCUMENTS

| | | | |
|---|---|---|---|
| 2019/0188711 A1* | 6/2019 | Wu | G06Q 20/389 |
| 2019/0266601 A1 | 8/2019 | Allen | |
| 2020/0034834 A1 | 1/2020 | Li et al. | |
| 2020/0402025 A1* | 12/2020 | Wang | G06Q 10/10 |
| 2021/0081920 A1* | 3/2021 | Spina | G06Q 20/227 |
| 2021/0241307 A1* | 8/2021 | Pavic | G06Q 30/0224 |

FOREIGN PATENT DOCUMENTS

| | | |
|---|---|---|
| CN | 109462588 | 3/2019 |
| CN | 109993530 | 7/2019 |
| CN | 110009332 | 7/2019 |
| CN | 110096905 | 8/2019 |
| CN | 110490728 | 11/2019 |
| CN | 110599143 | 12/2019 |
| CN | 110612546 | 12/2019 |
| CN | 110765200 | 2/2020 |
| CN | 110766401 | 2/2020 |
| CN | 110992038 | 4/2020 |
| CN | 110992039 | 4/2020 |
| CN | 111144881 | 5/2020 |
| CN | 111340631 | 6/2020 |
| WO | WO 2019058240 | 3/2019 |

OTHER PUBLICATIONS

Nakamoto, "Bitcoin: A Peer-to-Peer Electronic Cash System," www.bitcoin.org, 2005, 9 pages.

Extended European Search Report in European Application No. 21171456.3, dated Oct. 6, 2021, 8 pages.

PCT International Search Report in International Application No. PCT/CN2021/093908, dated Aug. 10, 2021, 11 pages (with English translation).

* cited by examiner

METHODS, APPARATUSES, DEVICES, AND SYSTEMS FOR ASSET TRANSFER

CROSS-REFERENCE TO RELATED APPLICATIONS

This application claims priority to Chinese Patent Application No. 202010413943.2, filed on May 15, 2020, which is hereby incorporated by reference in its entirety.

TECHNICAL FIELD

The present specification relates to the field of computer technologies, and in particular, to methods, apparatuses, devices, and systems for asset transfer.

BACKGROUND

A blockchain is widely used in various fields because of its features of openness, transparency, tamper-resistance, etc. A typical application is transaction processing based on the blockchain. For example, users transfer digital assets based on the blockchain. However, in the actual asset transfer process, transactions of the same asset may fail because the asset involves a plurality of transactions.

SUMMARY

The purpose of one or more embodiments of the present specification is to provide methods, apparatuses, devices, and systems for asset transfer, so as to resolve the problem that transactions of the same asset may fail because the asset involves a plurality of transactions.

To resolve the previous technical problem, one or more embodiments of the present specification provide the following solutions:

One or more embodiments of the present specification provide a method for asset transfer, which is applied to a blockchain node. The method includes the following: receiving an asset transfer request sent by a first client device, where the asset transfer request is sent based on an asset transfer operation of a first user, and the asset transfer request includes asset transfer information; invoking a first smart contract in a blockchain, and locking a to-be-transferred asset based on the first smart contract and the asset transfer information; sending asset information of the to-be-transferred asset to a designated trading platform, so that the trading platform determines, based on the asset information, a second user who trades with the first user; and obtaining asset transfer confirmation information from the first client device, and performing transfer processing on the locked to-be-transferred asset based on the asset transfer confirmation information, so as to transfer the to-be-transferred asset to the second user, where the asset transfer confirmation information includes information about the second user.

One or more embodiments of the present specification provide a method for asset transfer, which is applied to a first client device. The method includes the following: sending an asset transfer request to a blockchain node in response to an asset transfer operation of a first user, so that the blockchain node locks a to-be-transferred asset based on asset transfer information included in the asset transfer request; and sending asset information of the to-be-transferred asset to a designated trading platform, so that the trading platform determines, based on the asset information, a second user who trades with the first user; and sending asset transfer confirmation information to the blockchain node based on information about the second user, so that the blockchain node performs transfer processing on the locked to-be-transferred asset based on the asset transfer confirmation information, so as to transfer the to-be-transferred asset to the second user.

One or more embodiments of the present specification provide an apparatus for asset transfer, which is applied to a blockchain node. The apparatus includes a receiving module, configured to receive an asset transfer request sent by a first client device, where the asset transfer request is sent based on an asset transfer operation of a first user, and the asset transfer request includes asset transfer information. The apparatus further includes a locking module, configured to invoke a first smart contract in a blockchain, and lock a to-be-transferred asset based on the first smart contract and the asset transfer information. The apparatus further includes a sending module, configured to send asset information of the to-be-transferred asset to a designated trading platform, so that the trading platform determines, based on the asset information, a second user who trades with the first user. The apparatus further includes an acquisition module, configured to obtain asset transfer confirmation information from the first client device. The apparatus further includes a transfer module, configured to perform transfer processing on the locked to-be-transferred asset based on the asset transfer confirmation information, so as to transfer the to-be-transferred asset to the second user, where the asset transfer confirmation information includes information about the second user.

One or more embodiments of the present specification provide an apparatus for asset transfer, which is applied to a first client device. The apparatus includes a first sending module, configured to send an asset transfer request to a blockchain node in response to an asset transfer operation of a first user, so that the blockchain node locks a to-be-transferred asset based on asset transfer information included in the asset transfer request; and send asset information of the to-be-transferred asset to a designated trading platform, so that the trading platform determines, based on the asset information, a second user who trades with the first user. The apparatus further includes a second sending module, configured to send asset transfer confirmation information to the blockchain node based on information about the second user, so that the blockchain node performs transfer processing on the locked to-be-transferred asset based on the asset transfer confirmation information, so as to transfer the to-be-transferred asset to the second user.

One or more embodiments of the present specification provide a system for asset transfer. The system includes a first client device, a blockchain, and a trading platform. The first client device is configured to: send an asset transfer request to a blockchain node connected to the blockchain in response to an asset transfer operation of a first user, where the asset transfer request includes asset transfer information; and send asset transfer confirmation information to the blockchain node based on information about a second user, where the second user is a user who trades with the first user and is determined by the trading platform. The blockchain node connected to the blockchain is configured to: receive the asset transfer request sent by the first client device; invoke a first smart contract in the blockchain, and lock a to-be-transferred asset based on the first smart contract and the asset transfer information; send asset information of the to-be-transferred asset to the trading platform; and obtain the asset transfer confirmation information from the first client device, and perform transfer processing on the locked to-be-transferred asset based on the asset transfer confirmation information, so as to transfer the to-be-transferred asset to the second user. The trading platform is configured to: receive the asset information sent by the blockchain node, publish the asset information, and determine the second user who trades with the first user.

One or more embodiments of the present specification provide a device for asset transfer. The device includes a processor. The device further includes a memory, configured to store a computer-executable instruction, where when executed, the computer-executable instruction enables the processor to perform the following operations: receiving an asset transfer request sent by a first client device, where the asset transfer request is sent based on an asset transfer operation of a first user, and the asset transfer request includes asset transfer information; invoking a first smart contract in a blockchain, and locking a to-be-transferred asset based on the first smart contract and the asset transfer information; sending asset information of the to-be-transferred asset to a designated trading platform, so that the trading platform determines, based on the asset information, a second user who trades with the first user; and obtaining asset transfer confirmation information from the first client device, and performing transfer processing on the locked to-be-transferred asset based on the asset transfer confirmation information, so as to transfer the to-be-transferred asset to the second user, where the asset transfer confirmation information includes information about the second user.

One or more embodiments of the present specification provide a device for asset transfer. The device includes a processor. The device further includes a memory, configured to store a computer-executable instruction, where when executed, the computer-executable instruction enables the processor to perform the following operations: sending an asset transfer request to a blockchain node in response to an asset transfer operation of a first user, so that the blockchain node locks a to-be-transferred asset based on asset transfer information included in the asset transfer request; and sending asset information of the to-be-transferred asset to a designated trading platform, so that the trading platform determines, based on the asset information, a second user who trades with the first user; and sending asset transfer confirmation information to the blockchain node based on information about the second user, so that the blockchain node performs transfer processing on the locked to-be-transferred asset based on the asset transfer confirmation information, so as to transfer the to-be-transferred asset to the second user.

One or more embodiments of the present specification provide a storage medium. The storage medium is configured to store a computer-executable instruction, where when executed, the computer-executable instruction performs the following operations: receiving an asset transfer request sent by a first client device, where the asset transfer request is sent based on an asset transfer operation of a first user, and the asset transfer request includes asset transfer information; invoking a first smart contract in a blockchain, and locking a to-be-transferred asset based on the first smart contract and the asset transfer information; sending asset information of the to-be-transferred asset to a designated trading platform, so that the trading platform determines, based on the asset information, a second user who trades with the first user; and obtaining asset transfer confirmation information from the first client device, and performing transfer processing on the locked to-be-transferred asset based on the asset transfer confirmation information, so as to transfer the to-be-transferred asset to the second user, where the asset transfer confirmation information includes information about the second user.

One or more embodiments of the present specification provide a storage medium. The storage medium is configured to store a computer-executable instruction, where when executed, the computer-executable instruction performs the following operations: sending an asset transfer request to a blockchain node in response to an asset transfer operation of a first user, so that the blockchain node locks a to-be-transferred asset based on asset transfer information included in the asset transfer request; and sending asset information of the to-be-transferred asset to a designated trading platform, so that the trading platform determines, based on the asset information, a second user who trades with the first user; and sending asset transfer confirmation information to the blockchain node based on information about the second user, so that the blockchain node performs transfer processing on the locked to-be-transferred asset based on the asset transfer confirmation information, so as to transfer the to-be-transferred asset to the second user.

BRIEF DESCRIPTION OF DRAWINGS

To describe the technical solutions in one or more embodiments of the present specification or in the existing technology more clearly, the following briefly describes the accompanying drawings needed for describing the embodiments or the existing technology. Clearly, the accompanying drawings in the following descriptions merely show some embodiments of the present specification, and a person of ordinary skill in the art can still derive other drawings from these accompanying drawings without creative efforts.

DESCRIPTION OF EMBODIMENTS

To enable a person skilled in the art to better understand the technical solutions in one or more embodiments of the present specification, the following clearly and fully describes the technical solutions in one or more embodiments of the present specification with reference to the accompanying drawings in one or more embodiments of the present specification. Clearly, the described embodiments are merely some rather than all of the embodiments of the present specification. Based on one or more embodiments of the present specification, all other embodiments obtained by a person of ordinary skill in the art without creative efforts shall fall within the protection scope of the present specification.

Figure 1:
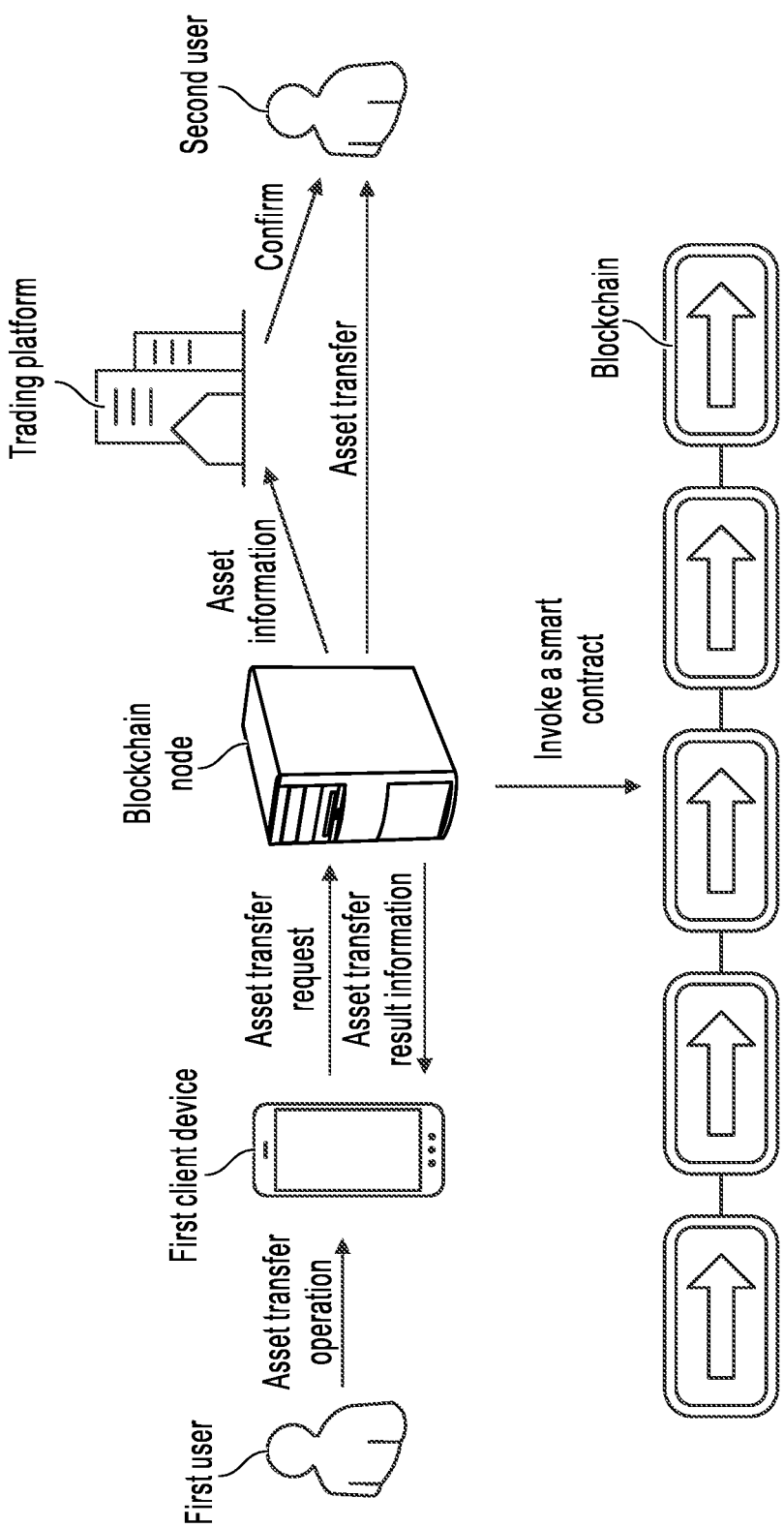
FIG. 1 is a schematic scenario diagram illustrating a method for asset transfer, according to one or more embodiments of the present specification.

FIG. 1 is a schematic diagram illustrating an application scenario of a method for asset transfer, according to one or more embodiments of the present specification. As shown in FIG. 1, the scenario includes the following: a first client device of a first user, a blockchain node connected to a blockchain, and a trading platform. The first client device can be a mobile phone, a tablet computer, a desktop computer, a portable notebook computer, or the like (only the mobile phone is shown in FIG. 1).

Specifically, when the first user needs to transfer an asset the first user owns, the first user operates the first user's first client device. The first client device sends an asset transfer request to the blockchain node based on determined asset transfer information in response to the asset transfer operation of the first user. The blockchain node invokes a first smart contract in the blockchain based on the received asset transfer request, and locks the to-be-transferred asset based on the first smart contract and the asset transfer information. The blockchain node sends asset information of the to-be-transferred asset to the designated trading platform. The trading platform publishes the received asset information for each user to access, and determines a second user who trades with the first user. When obtaining asset transfer confirmation information from the first client device, the blockchain node performs transfer processing on the locked to-be-transferred asset based on the asset transfer confirmation information, so as to transfer the to-be-transferred asset to the second user, where the asset transfer confirmation information includes information about the second user. The blockchain node sends asset transfer result information to the first client device. Therefore, the blockchain node locks the to-be-transferred asset when receiving the asset transfer request, and performs transfer processing on the locked to-be-transferred asset when obtaining the asset transfer confirmation information. As such, the same asset corresponds to only one transaction, avoiding the problem that transactions of the same asset fail because the asset involves a plurality of transactions, and ensuring the effective operation of each transaction.

Figure 2:
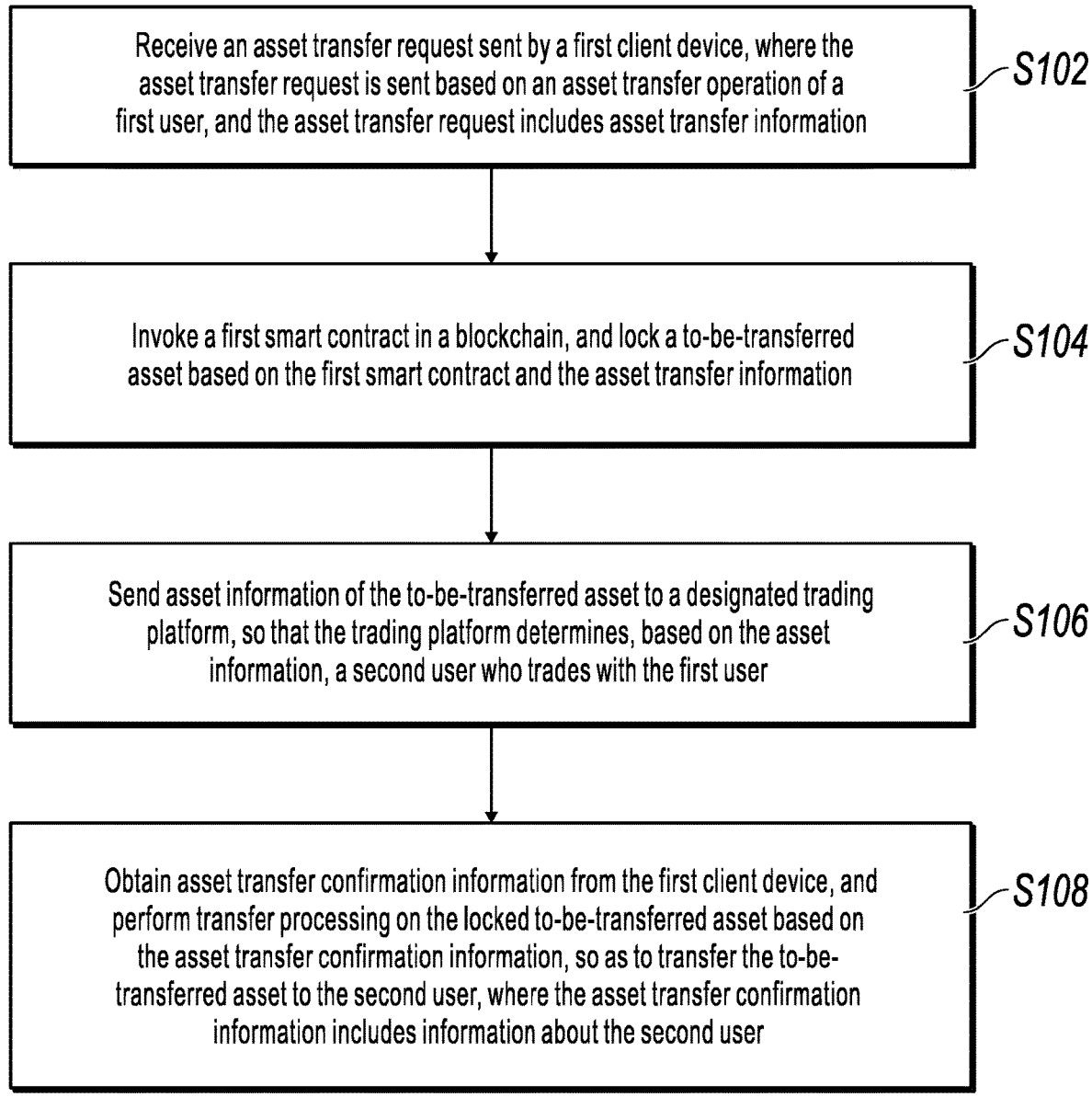
FIG. 2 is a first schematic flowchart illustrating a method for asset transfer, according to one or more embodiments of the present specification.

Based on the previous application scenario architecture, one or more embodiments of the present specification provide a method for asset transfer. FIG. 2 is a schematic flowchart illustrating a method for asset transfer, according to one or more embodiments of the present specification. The method in FIG. 2 can be performed by the blockchain node in FIG. 1. As shown in FIG. 2, the method includes the following steps:

Step S102: Receive an asset transfer request sent by a first client device, where the asset transfer request is sent based on an asset transfer operation of a first user, and the asset transfer request includes asset transfer information.

The asset transfer information varies with the to-be-transferred asset. For example, the to-be-transferred asset is a cargo warehouse receipt, and correspondingly, the asset transfer information can include first identification information of the to-be-transferred asset, user information of the first user, etc. For another example, the to-be-transferred asset is a specific type of bonus points, and correspondingly, the asset transfer information can include the first identification information of the to-be-transferred asset, a transfer quantity, the user information of the first user, etc. The user information is, for example, user identification information, etc.

Step S104: Invoke a first smart contract in a blockchain, and lock a to-be-transferred asset based on the first smart contract and the asset transfer information.

Step S106: Send asset information of the to-be-transferred asset to a designated trading platform, so that the trading platform determines, based on the asset information, a second user who trades with the first user.

The asset information varies with the to-be-transferred asset. For example, the to-be-transferred asset is a cargo warehouse receipt, and correspondingly, the asset information can include name information, origin information, quantity information, etc. of a cargo corresponding to the cargo warehouse receipt. For another example, the to-be-transferred asset is a specific type of bonus points, and correspondingly, the asset information can include type information, quantity information, etc. of the bonus points. When receiving the asset information of the to-be-transferred asset, the trading platform publishes the asset information for the user to access, and determines the second user who trades with the first user.

Step S108: Obtain asset transfer confirmation information from the first client device, and perform transfer processing on the locked to-be-transferred asset based on the asset transfer confirmation information, so as to transfer the to-be-transferred asset to the second user, where the asset transfer confirmation information includes information about the second user.

In one or more embodiments of the present specification, when receiving the asset transfer request sent by the first client device, the blockchain node locks the to-be-transferred asset and sends the asset information of the to-be-transferred asset to the designated trading platform, so that the trading platform determines the second user who trades with the first user. When obtaining the asset transfer information from the first client device, the blockchain node transfers the locked to-be-transferred asset to the second user. Therefore, when the asset transfer request is received, the to-be-transferred asset is locked, thus effectively avoiding an on-chain operation of the to-be-transferred asset based on other transaction requests during off-chain transaction processing of the trading platform, that is, avoiding the problem that transactions of the same asset fail because the asset involves a plurality of transactions, and ensuring the effective operation of each transaction.

Figure 3:
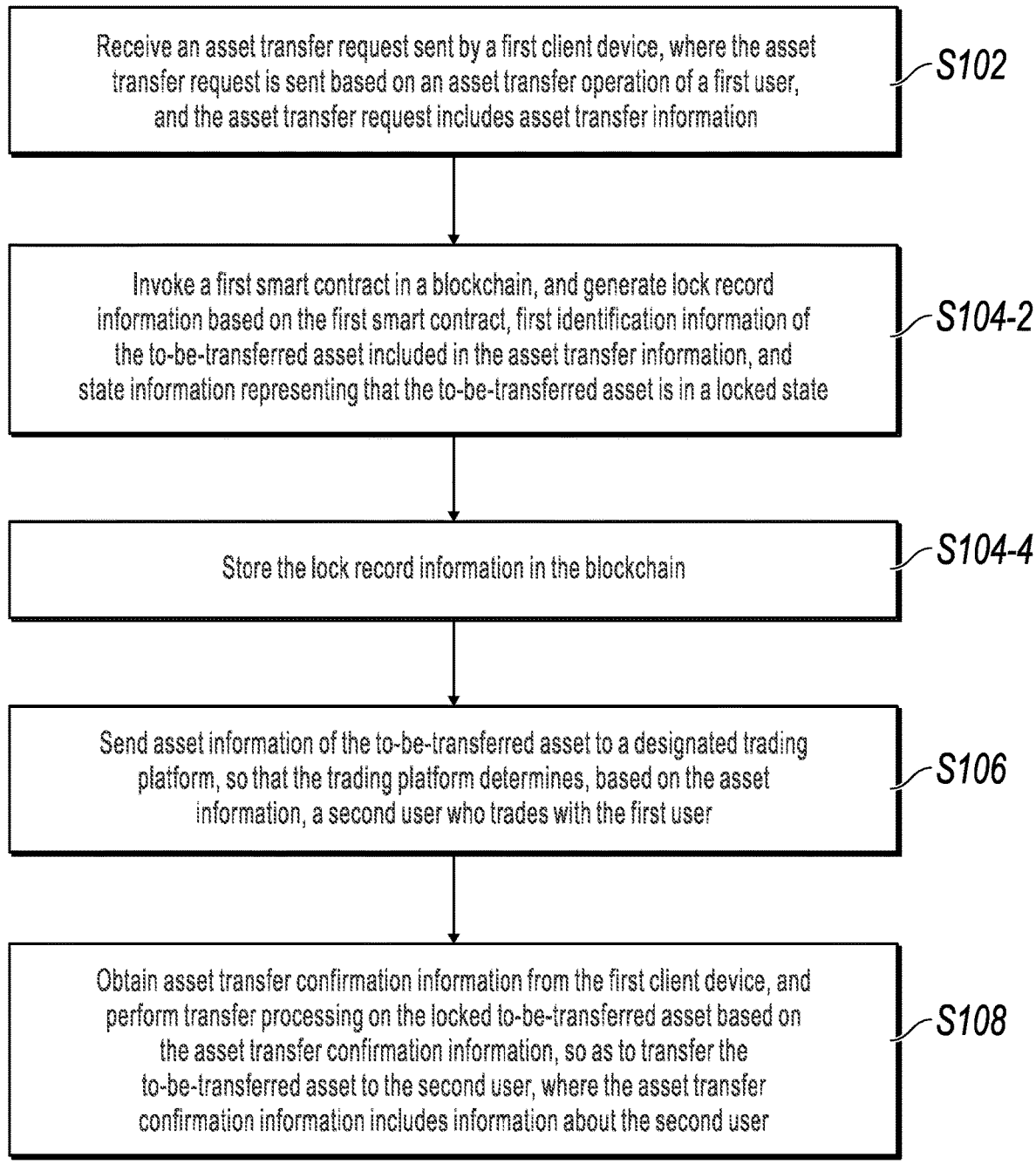
FIG. 3 is a second schematic flowchart illustrating a method for asset transfer, according to one or more embodiments of the present specification.

To facilitate the subsequent traceability of the asset locking operation, in one or more embodiments of the present specification, as shown in FIG. 3, step S104 includes the following:

Step S104-2: Invoke the first smart contract in the blockchain, and generate lock record information based on the first smart contract, first identification information of the to-be-transferred asset included in the asset transfer information, and state information representing that the to-be-transferred asset is in a locked state.

Step S104-4: Store the lock record information in the blockchain.

Storing the lock record information in the blockchain ensures that the locking operation can be traced, and when another transaction request involving the to-be-transferred asset is received, the locked state of the to-be-transferred asset can be determined based on the lock record information, so as to cancel the another transaction request in time, thus avoiding transaction failure because the to-be-transferred asset involves a plurality of transactions.

Figure 4:
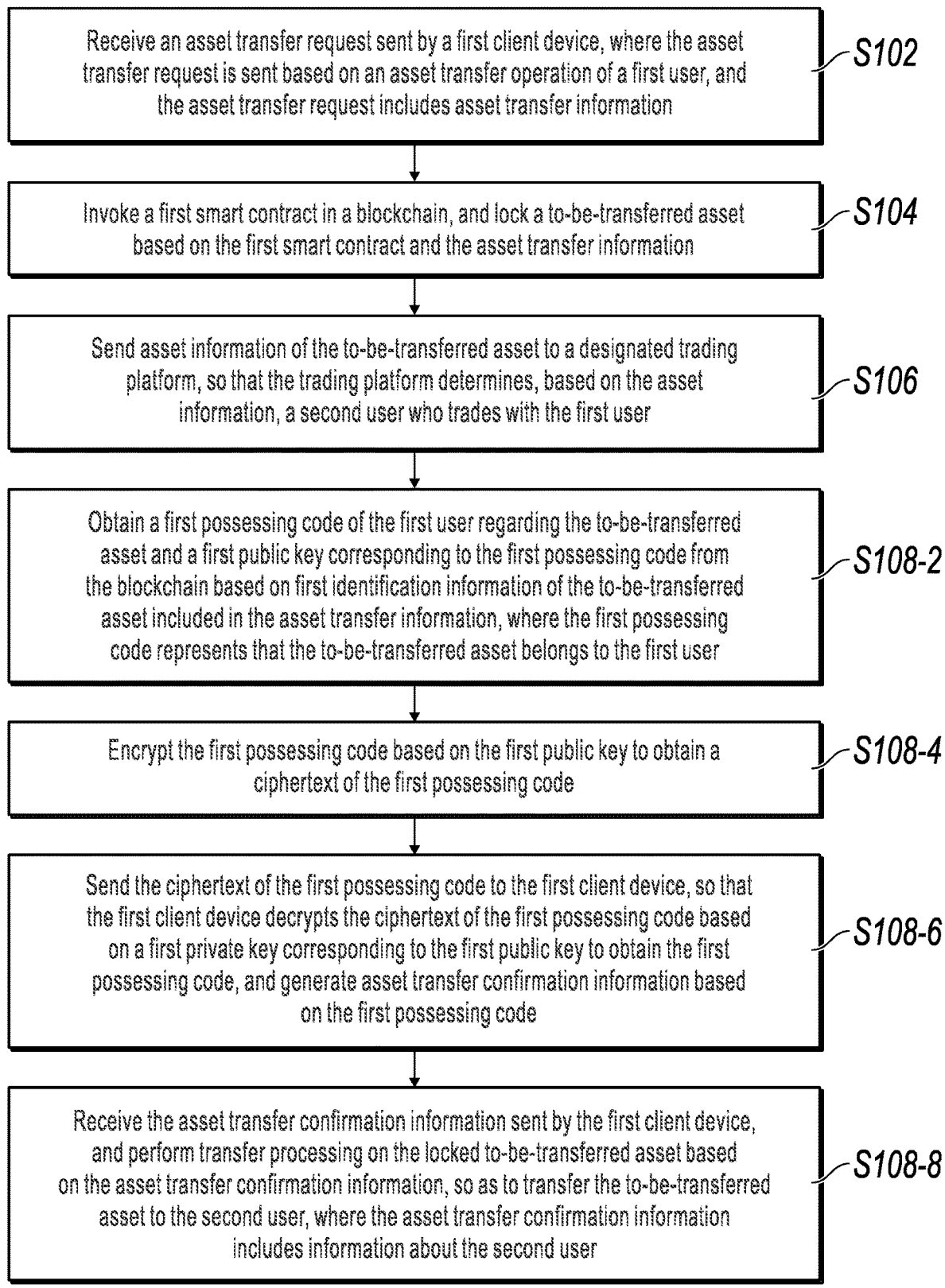
FIG. 4 is a third schematic flowchart illustrating a method for asset transfer, according to one or more embodiments of the present specification.

To verify ownership of a relevant user on the to-be-transferred asset in the asset transfer process, in one or more embodiments of the present specification, when it is determined that the asset belongs to a specific user, a corresponding possessing code is generated, and the possessing code, a public key of the user, identification information of the asset, etc. are correspondingly stored in the blockchain. Correspondingly, as shown in FIG. 4, step S108 includes the following:

Step S108-2: Obtain a first possessing code of the first user regarding the to-be-transferred asset and a first public key corresponding to the first possessing code from the blockchain based on first identification information of the to-be-transferred asset included in the asset transfer information, where the first possessing code represents that the to-be-transferred asset belongs to the first user.

Specifically, matching is performed between the first identification information of the to-be-transferred asset and each identification information stored in the blockchain. If the matching succeeds, a first possessing code and a first public key corresponding to the successfully matched identification information are obtained.

Step S108-4: Encrypt the first possessing code based on the first public key to obtain a ciphertext of the first possessing code.

Step S108-6: Send the ciphertext of the first possessing code to the first client device, so that the first client device decrypts the ciphertext of the first possessing code based on a first private key corresponding to the first public key to obtain the first possessing code, and generate the asset transfer confirmation information based on the first possessing code.

Specifically, when receiving the ciphertext of the first possessing code sent by the blockchain node, the first client device decrypts the ciphertext of the first possessing code based on the first private key corresponding to the first public key to obtain the first possessing code. The first client device displays the first possessing code so that the first user determines whether the first possessing code is the first user's own first possessing code. When a determination result is yes, the first user taps a confirmation control in the display interface to confirm the transfer of the asset. The first client device signs the first possessing code based on the first private key in response to the asset transfer confirmation operation of the first user, to obtain first signature data. The first client device generates asset transfer confirmation information based on the first signature data, the first identification information of the to-be-transferred asset, and the obtained second public key of the second user, and sends the asset transfer confirmation information to the blockchain node.

Optionally, the second user privately informs the first user of the second public key of the second user. Correspondingly, obtaining the second public key of the second user includes the following: obtaining the second public key of the second user submitted by the first user in response to the asset transfer confirmation operation of the first user. Alternatively, the first client device obtains the second public key of the second user, etc. from a designated institution based on the user information of the second user submitted by the first user in response to the asset transfer confirmation operation of the first user. The method for obtaining the second public key is not specifically limited in the present specification.

Step S108-8: Receive asset transfer confirmation information sent by the first client device, and perform transfer processing on the locked to-be-transferred asset based on the asset transfer confirmation information, so as to transfer the to-be-transferred asset to the second user, where the asset transfer confirmation information includes information about the second user.

Sending the ciphertext of the first possessing code to the first client device not only can effectively avoid leakage of the first possessing code, but also can verify an identity of the first user because the first private key corresponding to the first public key is held by the first user only.

Figure 5:
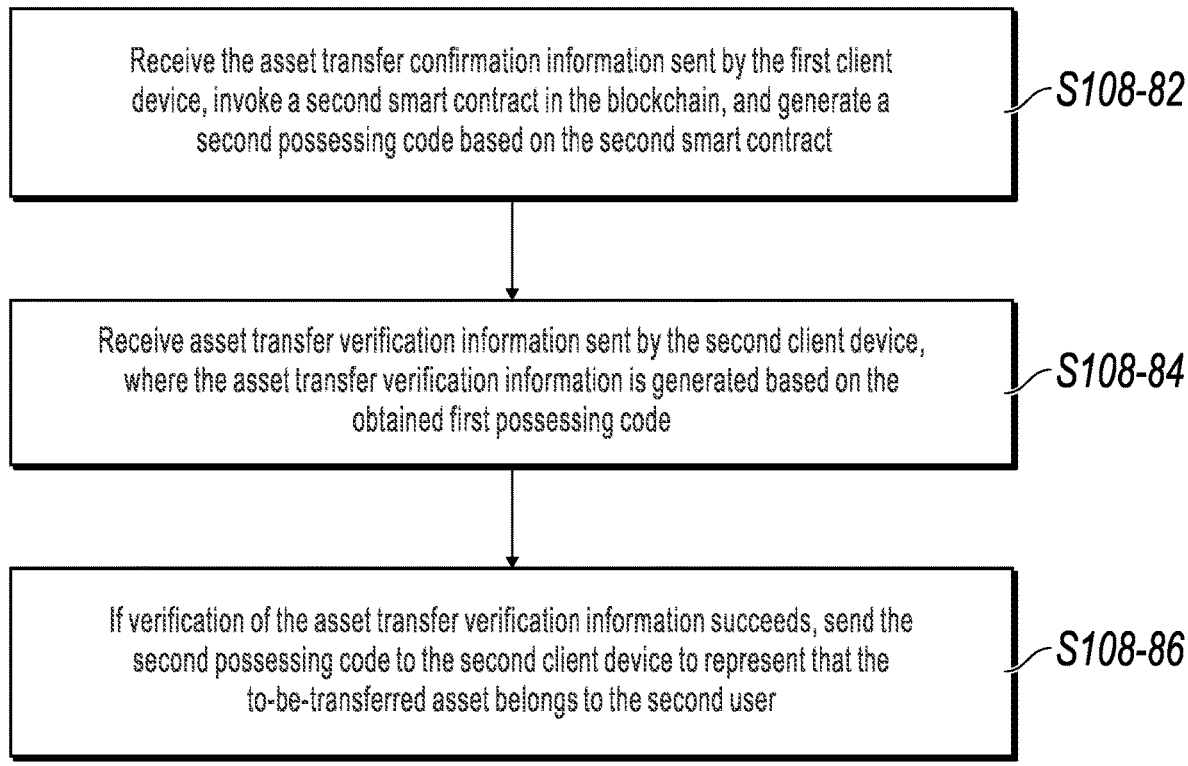
FIG. 5 is a first detailed diagram illustrating step S108, according to one or more embodiments of the present specification.

To ensure that the to-be-transferred asset can actually be transferred to the second user who trades with the first user, in one or more embodiments of the present specification, the first user can privately inform the second user of the first possessing code of the first user for the to-be-transferred asset, or the second user operates the second user's second client device to send a possessing code acquisition request to the first client device to obtain the first possessing code, thereby obtaining the to-be-transferred asset based on the first possessing code. Correspondingly, as shown in FIG. 5, step S108-8 can include the following steps S108-82 to S108-86:

Step S108-82: Receive the asset transfer confirmation information sent by the first client device, invoke a second smart contract in the blockchain, and generate a second possessing code based on the second smart contract.

Step S108-84: Receive asset transfer verification information sent by the second client device, where the asset transfer verification information is generated based on the obtained first possessing code.

Specifically, the second client device uses the first private key corresponding to the second public key to sign the obtained first possessing code to obtain second signature data, in response to the resource acquisition operation of the second user; the second client device generates the asset transfer verification information based on the second signature data, the first identification information of the to-be-transferred asset, the user information of the second user, etc.; the second client device sends the asset transfer verification information to the blockchain node.

Step S108-86: If verification of the asset transfer verification information succeeds, send the second possessing code to the second client device to represent that the to-be-transferred asset belongs to the second user.

The blockchain node sends the ciphertext of the first possessing code to the first client device, so that the first user confirms whether to transfer the asset, and receives the asset transfer verification information sent by the second client device based on the obtained first possessing code. As such, a closed loop is formed based on the first possessing code, ensuring that the to-be-transferred asset which belongs to the first user can be transferred from the first user to the second user who trades with the first user.

Figure 6:
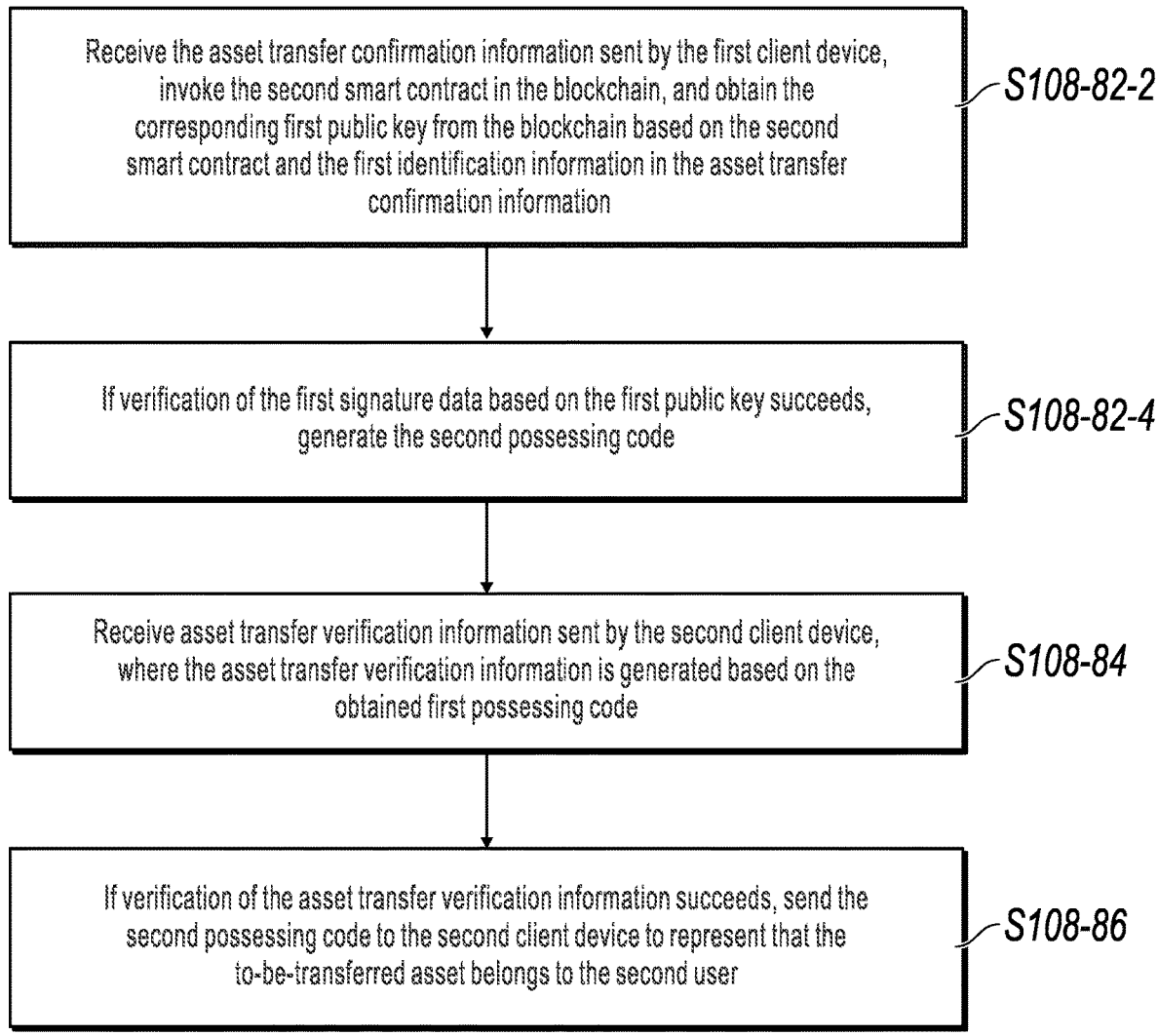
FIG. 6 is a second detailed diagram illustrating step S108, according to one or more embodiments of the present specification.

Further, to ensure that the asset transfer confirmation information comes from the first user, in one or more embodiments of the present specification, the first signature data in the asset transfer confirmation information is further verified before the second possessing code is generated. Specifically, as shown in FIG. 6, step S108-82 can include the following steps:

Step S108-82-2: Receive the asset transfer confirmation information sent by the first client device, invoke the second smart contract in the blockchain, and obtain the corresponding first public key from the blockchain based on the second smart contract and the first identification information in the asset transfer confirmation information.

Step S108-82-4: If verification of the first signature data based on the first public key succeeds, generate the second possessing code.

Specifically, the corresponding first possessing code is obtained from the blockchain based on the first identification information in the asset transfer confirmation information; the first signature data is verified based on the obtained first public key to obtain the first possessing code; matching is performed between the received first possessing code and the obtained first possessing code; if the matching succeeds, it is determined that the verification succeeds, and the second possessing code is generated; if the matching fails, it is determined that the verification fails, and asset transfer failure information is sent to the first client device. The rule for generating a possessing code can be independently set according to needs in practice.

Figure 7:
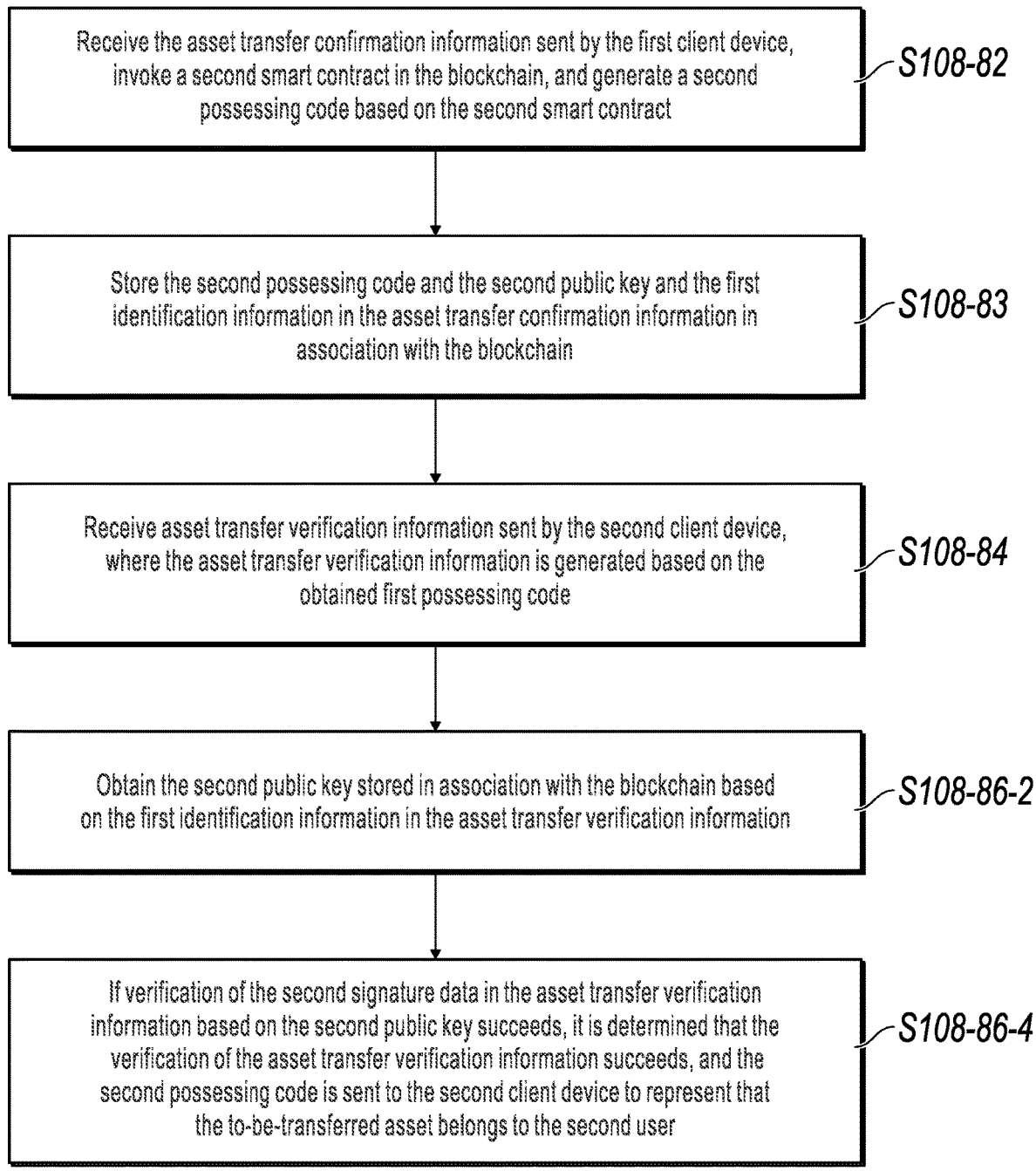
FIG. 7 is a third detailed diagram illustrating step S108, according to one or more embodiments of the present specification.

Further, to prevent the first possessing code of the first user from being stolen by another user, where the another user impersonates the second user to send asset transfer verification information to the blockchain node, in one or more embodiments of the present specification, as shown in FIG. 7, after step S108-82, the method further includes the following steps:

Step S108-83: Store the second possessing code and the second public key and the first identification information in the asset transfer confirmation information in association with the blockchain.

Correspondingly, as shown in FIG. 7, step S108-86 includes the following steps S108-86-2 and S108-86-4:

Step S108-86-2: Obtain the second public key stored in association with the blockchain based on the first identification information in the asset transfer verification information.

Specifically, the last associated record information is queried from the blockchain based on the first identification information in the asset transfer verification information, and it is determined whether the identified record information is lock record information. If the identified record information is lock record information, the second public key stored in association is obtained from the blockchain based on the first identification information in the asset transfer verification information. If the identified record information is not lock record information, the asset acquisition failure information is sent to the second client device.

Step S108-86-4: If verification of the second signature data in the asset transfer verification information based on the second public key succeeds, it is determined that the verification of the asset transfer verification information succeeds, and the second possessing code is sent to the second client device to represent that the to-be-transferred asset belongs to the second user.

Specifically, the first possessing code stored in association is obtained from the blockchain based on the first identification information in the asset transfer verification information; the second signature data in the asset transfer verification information is verified based on the obtained second public key to obtain the first possessing code; matching is performed between the obtained first possessing code and the received first possessing code; if the matching succeeds, the second possessing code is sent to the second client device; if the matching fails, asset acquisition failure information is sent to the second client device.

Figure 8:
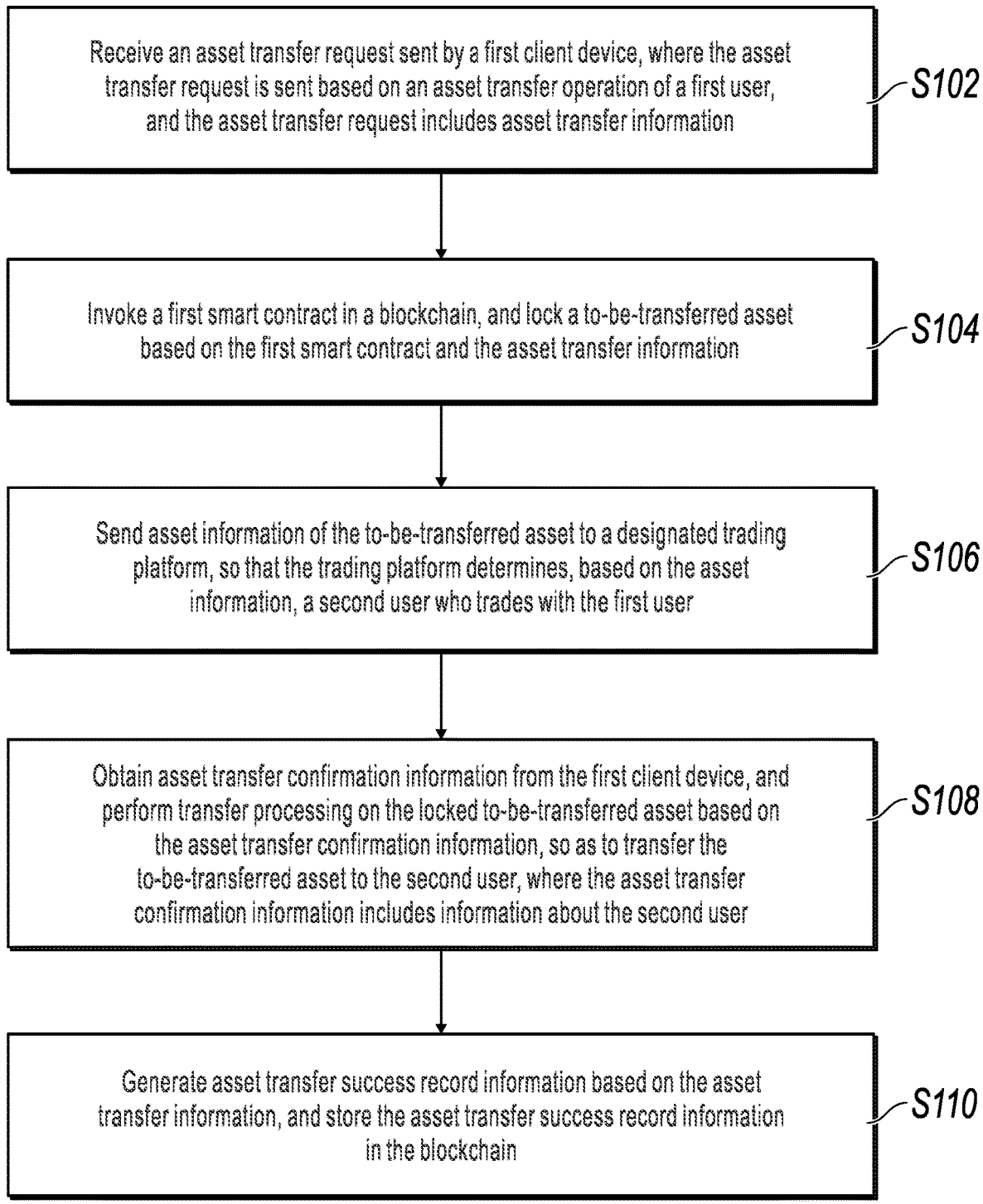
FIG. 8 is a fourth schematic flowchart illustrating a method for asset transfer, according to one or more embodiments of the present specification.

So far, based on the verification of the first signature data and the second signature data, effective transfer of the to-be-transferred asset has been implemented. To release the locked state of the to-be-transferred asset and to facilitate subsequent traceability of the asset transfer process, as shown in FIG. 8, after step S108, the method further includes the following step:

Step S110: Generate asset transfer success record information based on the asset transfer information, and store the asset transfer success record information in the blockchain.

Specifically, the first identification information of the to-be-transferred asset in the asset transfer information, the user information of the first user, the user information of the second user included in the asset transfer confirmation information, etc. are recorded in association, and the recorded information is determined as the asset transfer success record information. The asset transfer success record information represents that the to-be-transferred asset is in an unlocked state.

Further, to let the first user know the resource transfer result, after step S108, the method further includes the following: sending resource transfer result information to the first client device.

In one or more embodiments of the present specification, when receiving the asset transfer request sent by the first client device, the blockchain node locks the to-be-transferred asset and sends the asset information of the to-be-transferred asset to the designated trading platform, so that the trading platform determines the second user who trades with the first user. When obtaining the asset transfer information from the first client device, the blockchain node transfers the locked to-be-transferred asset to the second user. Therefore, when the asset transfer request is received, the to-be-transferred asset is locked, thus effectively avoiding an on-chain operation of the to-be-transferred asset based on other transaction requests during off-chain transaction processing of the trading platform, that is, avoiding the problem that transactions of the same asset fail because the asset involves a plurality of transactions, and ensuring the effective operation of each transaction.

Figure 9:
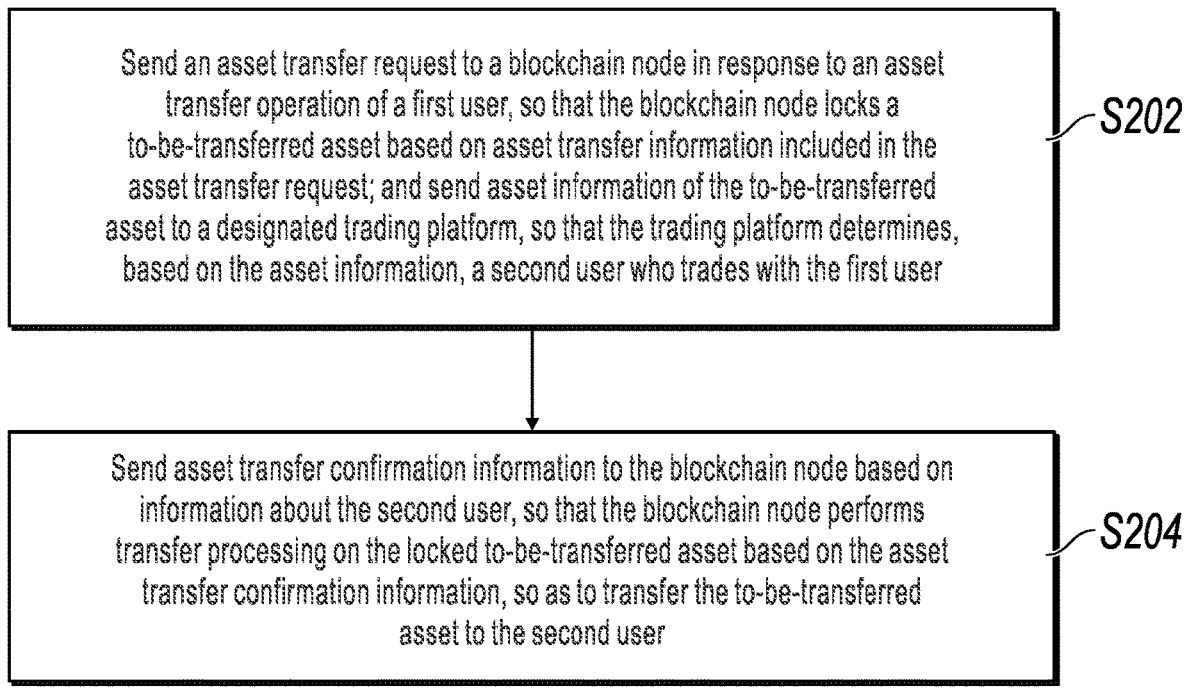
FIG. 9 is a fifth schematic flowchart illustrating a method for asset transfer, according to one or more embodiments of the present specification.

Corresponding to the method for asset transfer described in FIG. 2 to FIG. 8, based on the same technical concept, one or more embodiments of the present specification further provide another method for asset transfer. FIG. 9 is a schematic flowchart illustrating another method for asset transfer, according to one or more embodiments of the present specification. The method in FIG. 9 can be performed by the first client device in FIG. 1. As shown in FIG. 9, the method includes the following steps:

Step S202: Send an asset transfer request to a blockchain node in response to an asset transfer operation of a first user, so that the blockchain node locks a to-be-transferred asset based on asset transfer information included in the asset transfer request; and send asset information of the to-be-transferred asset to a designated trading platform, so that the trading platform determines, based on the asset information, a second user who trades with the first user.

The asset transfer information includes first identification information of the to-be-transferred asset, user information of the first user, etc. The user information is, for example, user identification information, etc.

Step S204: Send asset transfer confirmation information to the blockchain node based on information about the second user, so that the blockchain node performs transfer processing on the locked to-be-transferred asset based on the asset transfer confirmation information, so as to transfer the to-be-transferred asset to the second user.

In one or more embodiments of the present specification, the first client device sends the asset transfer request to the blockchain node based on the asset transfer operation of the first user, so that the blockchain node locks the to-be-transferred asset based on the asset transfer request; and the first client device sends the asset transfer confirmation information to the blockchain node based on the information about the second user determined by the trading platform, so that the blockchain node transfers the to-be-transferred asset to the second user. Therefore, locking the to-be-transferred asset effectively prevents the blockchain node from performing an on-chain operation of the to-be-transferred asset based on other transaction requests during off-chain transaction processing of the trading platform, that is, avoids the problem that transactions of the same asset fail because the asset involves a plurality of transactions, and ensures the effective operation of each transaction.

Figure 10:
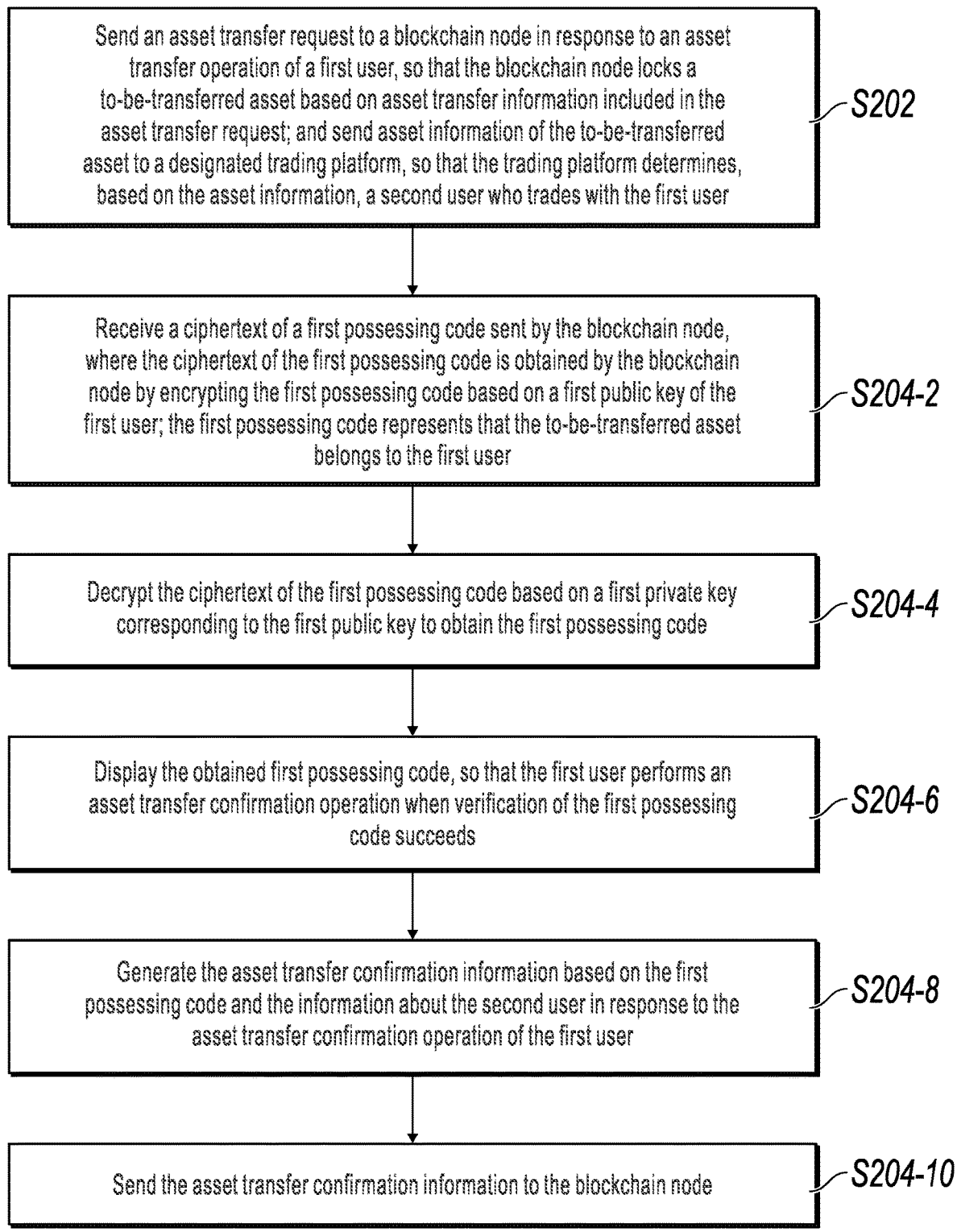
FIG. 10 is a sixth schematic flowchart illustrating a method for asset transfer, according to one or more embodiments of the present specification.

In order for the blockchain node to determine the validity of the asset transfer confirmation information, as shown in FIG. 10, in one or more embodiments of the present specification, step S204 includes the following steps:

Step S204-2: Receive a ciphertext of a first possessing code sent by the blockchain node, where the ciphertext of the first possessing code is obtained by the blockchain node by encrypting the first possessing code based on a first public key of the first user; the first possessing code represents that the to-be-transferred asset belongs to the first user.

Specifically, when receiving the asset transfer request, the blockchain node obtains the associated first possessing code and first public key from the blockchain based on the first identification information of the to-be-transferred asset included in the asset transfer request; and encrypts the first possessing code based on the obtained first public key to obtain a ciphertext of the first possessing code, and sends the ciphertext of the first possessing code to the first client device.

Step S204-4: Decrypt the ciphertext of the first possessing code based on a first private key corresponding to the first public key to obtain the first possessing code.

Step S204-6: Display the obtained first possessing code, so that the first user performs an asset transfer confirmation operation when verification of the first possessing code succeeds.

Specifically, the first user determines whether the first possessing code displayed by the first client device is the first user's own first possessing code; and when a determination result is yes, the first user taps a confirmation control in the display interface to confirm the transfer of the asset.

Step S204-8: Generate the asset transfer confirmation information based on the first possessing code and the information about the second user in response to the asset transfer confirmation operation of the first user.

Step S204-10: Send the asset transfer confirmation information to the blockchain node.

Figure 11:
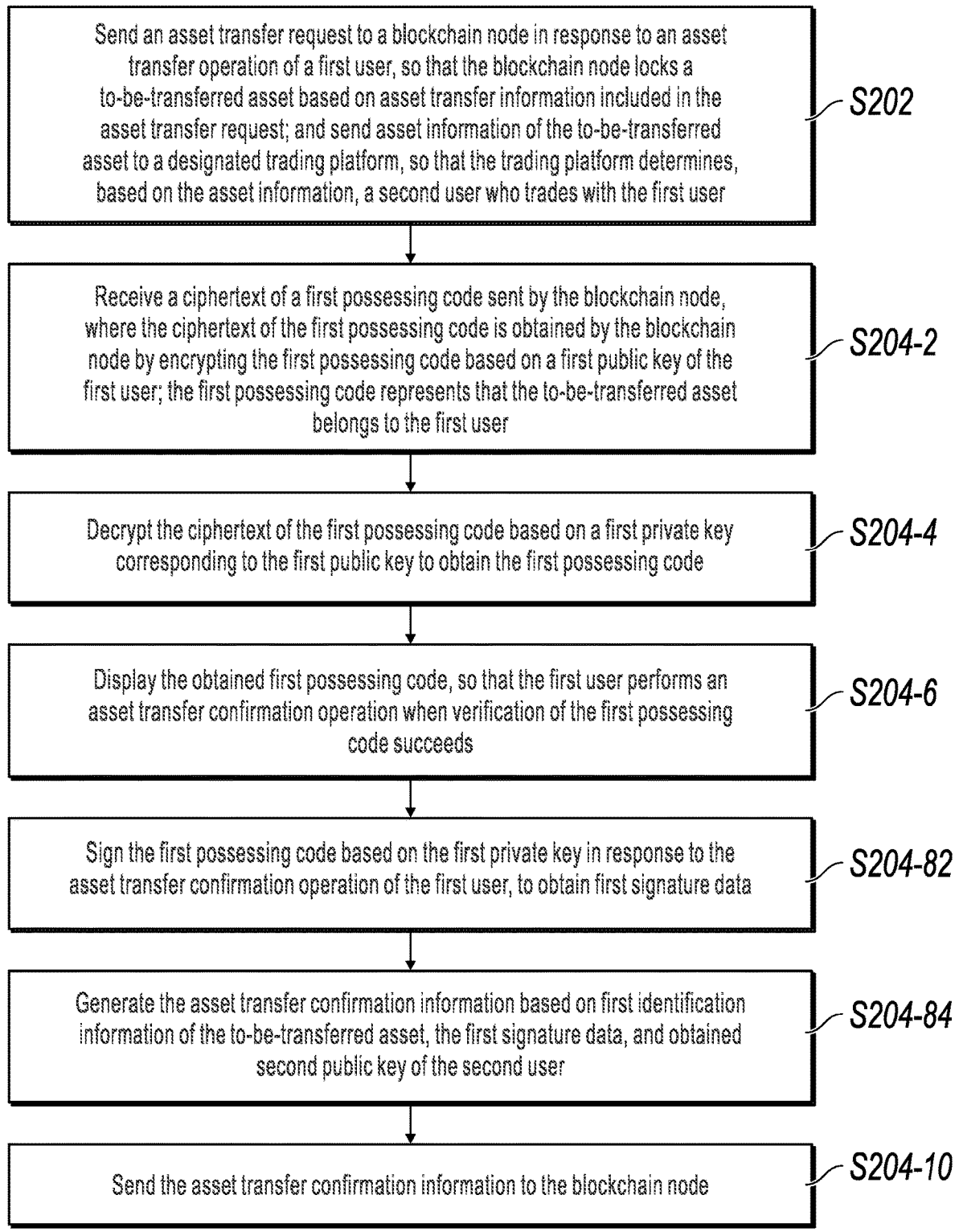
FIG. 11 is a seventh schematic flowchart illustrating a method for asset transfer, according to one or more embodiments of the present specification.

Further, to enable the blockchain node to verify the second signature data in the asset transfer verification information when receiving the asset transfer verification information sent by the second client device of the second user, in one or more embodiments of the present specification, as shown in FIG. 11, step S204-8 includes the following steps:

Step S204-82: Sign the first possessing code based on the first private key in response to the asset transfer confirmation operation of the first user, to obtain first signature data.

Step S204-84: Generate the asset transfer confirmation information based on first identification information of the to-be-transferred asset, the first signature data, and obtained second public key of the second user.

The asset transfer confirmation information can further include user information of the second user, such as a user identifier, etc. When receiving the asset transfer verification information sent by the second client device of the second user, the blockchain node verifies and signs the second signature data in the asset transfer verification information based on the second public key.

Optionally, the second user privately informs the first user of the second public key of the second user. Correspondingly, obtaining the second public key of the second user includes the following: obtaining the second public key of the second user submitted by the first user in response to the asset transfer confirmation operation of the first user. Alternatively, the first client device obtains the second public key of the second user, etc. from a designated institution based on the user information of the second user submitted by the first user in response to the asset transfer confirmation operation of the first user. The method for obtaining the second public key is not specifically limited in the present specification.

To ensure that the second user successfully obtains the resource to be transferred, in one or more embodiments of the present specification, after step S202, the method can further include the following: receiving a possessing code acquisition request sent by the second client device, and sending the first possessing code of the first user regarding the to-be-transferred asset to the second client device, so that the second client device generates asset transfer verification information based on the first possessing code and sends the asset transfer verification information to the blockchain node.

In one or more embodiments of the present specification, the first client device sends the asset transfer request to the blockchain node based on the asset transfer operation of the first user, so that the blockchain node locks the to-be-transferred asset based on the asset transfer request; and the first client device sends the asset transfer confirmation information to the blockchain node based on the information about the second user determined by the trading platform, so that the blockchain node transfers the to-be-transferred asset to the second user. Therefore, locking the to-be-transferred asset effectively prevents the blockchain node from performing an on-chain operation of the to-be-transferred asset based on other transaction requests during off-chain transaction processing of the trading platform, that is, avoids the problem that transactions of the same asset fail because the asset involves a plurality of transactions, and ensures the effective operation of each transaction.

Figure 12:
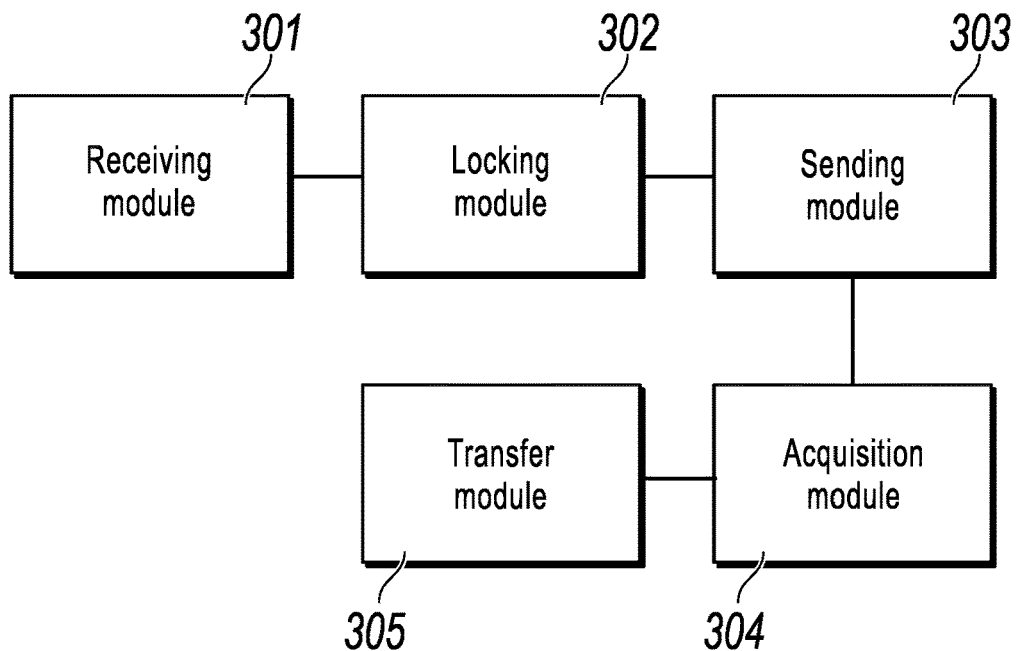
FIG. 12 is a first schematic module composition diagram illustrating an apparatus for asset transfer, according to one or more embodiments of the present specification.

Corresponding to the method for asset transfer described in FIG. 2 to FIG. 8, based on the same technical concept, one or more embodiments of the present specification further provide an apparatus for asset transfer, which is applied to a blockchain node. FIG. 12 is a schematic module composition diagram illustrating an apparatus for asset transfer, according to one or more embodiments of the present specification. As shown in FIG. 12, the apparatus includes the following: a receiving module 301, configured to receive an asset transfer request sent by a first client device, where the asset transfer request is sent based on an asset transfer operation of a first user, and the asset transfer request includes asset transfer information; a locking module 302, configured to invoke a first smart contract in a blockchain, and lock a to-be-transferred asset based on the first smart contract and the asset transfer information; a sending module 303, configured to send asset information of the to-be-transferred asset to a designated trading platform, so that the trading platform determines, based on the asset information, a second user who trades with the first user; an acquisition module 304, configured to obtain asset transfer confirmation information from the first client device; and a transfer module 305, configured to perform transfer processing on the locked to-be-transferred asset based on the asset transfer confirmation information, so as to transfer the to-be-transferred asset to the second user, where the asset transfer confirmation information includes information about the second user.

When receiving the asset transfer request sent by the first client device, the apparatus for asset transfer provided in one or more embodiments of the present specification locks the to-be-transferred asset and sends the asset information of the to-be-transferred asset to the designated trading platform, so that the trading platform determines the second user who trades with the first user. When obtaining the asset transfer information from the first client device, the apparatus for asset transfer transfers the locked to-be-transferred asset to the second user. Therefore, when the asset transfer request is received, the to-be-transferred asset is locked, thus effectively avoiding an on-chain operation of the to-be-transferred asset based on other transaction requests during off-chain transaction processing of the trading platform, that is, avoiding the problem that transactions of the same asset fail because the asset involves a plurality of transactions, and ensuring the effective operation of each transaction.

Optionally, the asset transfer information includes first identification information of the to-be-transferred asset; and the acquisition module 304 is configured to: obtain a first possessing code of the first user regarding the to-be-transferred asset and a first public key corresponding to the first possessing code from the blockchain based on the first identification information, where the first possessing code represents that the to-be-transferred asset belongs to the first user; encrypt the first possessing code based on the first public key to obtain a ciphertext of the first possessing code; send the ciphertext of the first possessing code to the first client device, so that the first client device decrypts the ciphertext of the first possessing code based on a first private key corresponding to the first public key to obtain the first possessing code, and generate the asset transfer confirmation information based on the first possessing code; and receive the asset transfer confirmation information sent by the first client device.

Optionally, the transfer module 305 is configured to: invoke a second smart contract in the blockchain, and generate a second possessing code based on the second smart contract; and receive asset transfer verification information sent by the second client device, where the asset transfer verification information is generated based on the obtained first possessing code; and if verification of the asset transfer verification information succeeds, send the second possessing code to the second client device to represent that the to-be-transferred asset belongs to the second user.

Optionally, the asset transfer confirmation information further includes the following: the first identification information, and first signature data obtained by signing the first possessing code based on the first private key; and the transfer module 305 is configured to: obtain the corresponding first public key from the blockchain based on the second smart contract and the first identification information; and if verification of the first signature data based on the first public key succeeds, generate the second possessing code.

Optionally, the asset transfer confirmation information further includes a second public key of the second user; the asset transfer verification information includes the following: the first identification information, and second signature data obtained by signing the first possessing code based on a second private key corresponding to the second public key; and the transfer module 305 is further configured to: after the generating a second possessing code based on the second smart contract, store the second possessing code, the second public key, and the first identification information in association with the blockchain; and obtain the second public key stored in association with the blockchain based on the first identification information in the asset transfer verification information; and if verification of the second signature data based on the second public key succeeds, determine that the verification of the asset transfer verification information succeeds.

Optionally, the asset transfer information includes first identification information of the to-be-transferred asset; and the locking module 302 is configured to: generate lock record information based on the first smart contract, the first identification information, and state information representing that the to-be-transferred asset is in a locked state; and store the lock record information in the blockchain.

Optionally, the apparatus further includes a generation module; and the generation module is configured to: generate asset transfer success record information based on the asset transfer information after the transfer module 305 successfully transfers the locked to-be-transferred asset based on the asset transfer confirmation information; and store the asset transfer success record information in the blockchain.

When receiving the asset transfer request sent by the first client device, the apparatus for asset transfer provided in one or more embodiments of the present specification locks the to-be-transferred asset and sends the asset information of the to-be-transferred asset to the designated trading platform, so that the trading platform determines the second user who trades with the first user. When obtaining the asset transfer information from the first client device, the apparatus for asset transfer transfers the locked to-be-transferred asset to the second user. Therefore, when the asset transfer request is received, the to-be-transferred asset is locked, thus effectively avoiding an on-chain operation of the to-be-transferred asset based on other transaction requests during off-chain transaction processing of the trading platform, that is, avoiding the problem that transactions of the same asset fail because the asset involves a plurality of transactions, and ensuring the effective operation of each transaction.

It is worthwhile to note that, the embodiments of the apparatus for asset transfer applied to the blockchain node in the present specification are based on the same inventive concept as the embodiments of the method for asset transfer applied to the blockchain node in the present specification. Therefore, for specific implementation of the embodiments of the apparatus for asset transfer, references can be made to the previous corresponding implementation of the method for asset transfer applied to the blockchain node, and repeated parts are omitted for simplicity.

Figure 13:
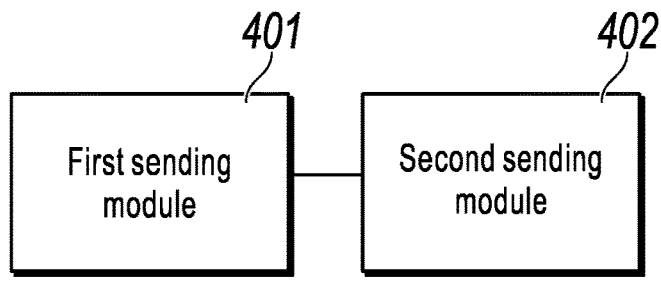
FIG. 13 is a second schematic module composition diagram illustrating an apparatus for asset transfer, according to one or more embodiments of the present specification.

Further, corresponding to the method for asset transfer described in FIG. 9 to FIG. 11, based on the same technical concept, one or more embodiments of the present specification further provide another apparatus for asset transfer, which is applied to a first client device. FIG. 13 is a schematic module composition diagram illustrating another apparatus for asset transfer, according to one or more embodiments of the present specification. As shown in FIG. 13, the apparatus includes the following: a first sending module 401, configured to: send an asset transfer request to a blockchain node in response to an asset transfer operation of a first user, so that the blockchain node locks a to-be-transferred asset based on asset transfer information included in the asset transfer request; and send asset information of the to-be-transferred asset to a designated trading platform, so that the trading platform determines, based on the asset information, a second user who trades with the first user; and a second sending module 402, configured to: send asset transfer confirmation information to the blockchain node based on information about the second user, so that the blockchain node performs transfer processing on the locked to-be-transferred asset based on the asset transfer confirmation information, so as to transfer the to-be-transferred asset to the second user.

The apparatus for asset transfer provided in one or more embodiments of the present specification sends the asset transfer request to the blockchain node based on the asset transfer operation of the first user, so that the blockchain node locks the to-be-transferred asset based on the asset transfer request; and the apparatus for asset transfer sends the asset transfer confirmation information to the blockchain node based on the information about the second user determined by the trading platform, so that the blockchain node transfers the to-be-transferred asset to the second user. Therefore, locking the to-be-transferred asset effectively prevents the blockchain node from performing an on-chain operation of the to-be-transferred asset based on other transaction requests during off-chain transaction processing of the trading platform, that is, avoids the problem that transactions of the same asset fail because the asset involves a plurality of transactions, and ensures the effective operation of each transaction.

Optionally, the second sending module 402 is configured to: receive a ciphertext of a first possessing code sent by the blockchain node, where the ciphertext of the first possessing code is obtained by the blockchain node by encrypting the first possessing code based on a first public key of the first user; the first possessing code represents that the to-be-transferred asset belongs to the first user; decrypt the ciphertext of the first possessing code based on a first private key corresponding to the first public key to obtain the first possessing code; display the obtained first possessing code, so that the first user performs an asset transfer confirmation operation when verification of the first possessing code succeeds; generate the asset transfer confirmation information based on the first possessing code and the information about the second user in response to the asset transfer confirmation operation of the first user; and send the asset transfer confirmation information to the blockchain node.

Optionally, the second sending module 402 is configured to: sign the first possessing code based on the first private key to obtain first signature data; and generate the asset transfer confirmation information based on first identification information of the to-be-transferred asset, the first signature data, and obtained second public key of the second user.

The apparatus for asset transfer provided in one or more embodiments of the present specification sends the asset transfer request to the blockchain node based on the asset transfer operation of the first user, so that the blockchain node locks the to-be-transferred asset based on the asset transfer request; and the apparatus for asset transfer sends the asset transfer confirmation information to the blockchain node based on the information about the second user determined by the trading platform, so that the blockchain node transfers the to-be-transferred asset to the second user. Therefore, locking the to-be-transferred asset effectively prevents the blockchain node from performing an on-chain operation of the to-be-transferred asset based on other transaction requests during off-chain transaction processing of the trading platform, that is, avoids the problem that transactions of the same asset fail because the asset involves a plurality of transactions, and ensures the effective operation of each transaction.

It is worthwhile to note that, the embodiments of the apparatus for asset transfer applied to the first client device in the present specification are based on the same inventive concept as the embodiments of the method for asset transfer applied to the first client device in the present specification. Therefore, for specific implementation of the embodiments of the apparatus for asset transfer, references can be made to the previous corresponding implementation of the method for asset transfer applied to the first client device, and repeated parts are omitted for simplicity.

Figure 14:
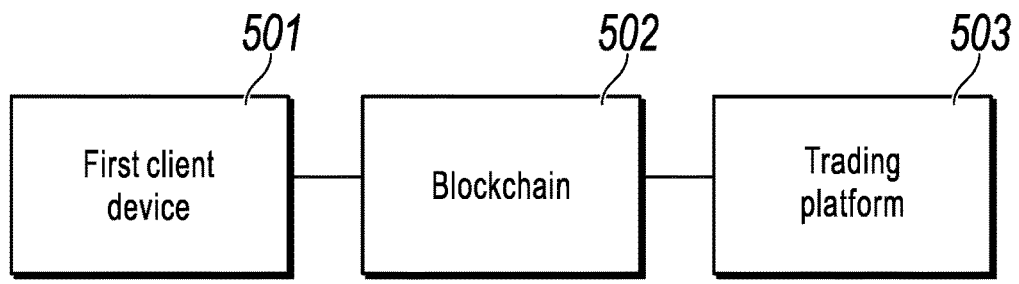
FIG. 14 is a first schematic composition diagram illustrating a system for asset transfer, according to one or more embodiments of the present specification.

Further, corresponding to the method for asset transfer described previously, based on the same technical concept, one or more embodiments of the present specification further provide a system for asset transfer. FIG. 14 is a schematic composition diagram illustrating a system for asset transfer, according to one or more embodiments of the present specification. As shown in FIG. 14, the system includes a first client device 501, a blockchain 502, and a trading platform 503.

The first client device 501 is configured to: send an asset transfer request to a blockchain node connected to the blockchain 502 in response to an asset transfer operation of a first user, where the asset transfer request includes asset transfer information; and send asset transfer confirmation information to the blockchain node based on information about a second user, where the second user is a user who trades with the first user and is determined by the trading platform 503.

The blockchain node connected to the blockchain 502 is configured to: receive the asset transfer request sent by the first client device 501; invoke a first smart contract in the blockchain, and lock a to-be-transferred asset based on the first smart contract and the asset transfer information; send asset information of the to-be-transferred asset to the trading platform 503; and obtain the asset transfer confirmation information from the first client device 501, and perform transfer processing on the locked to-be-transferred asset based on the asset transfer confirmation information, so as to transfer the to-be-transferred asset to the second user.

The trading platform 503 is configured to: receive the asset information sent by the blockchain node, publish the asset information, and determine the second user who trades with the first user.

Figure 15:
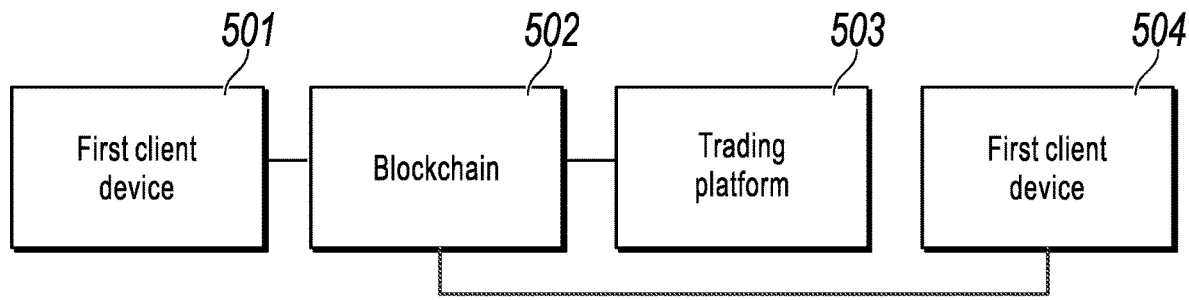
FIG. 15 is a second schematic composition diagram illustrating a system for asset transfer, according to one or more embodiments of the present specification.

Optionally, as shown in FIG. 15, the system further includes a second client device 504 of the second user; the second client device 504 is configured to: obtain a first possessing code in response to an asset acquisition operation of the second user; generate asset transfer verification information based on the first possessing code, and send the asset transfer verification information to the blockchain node, where the first possessing code represents that the to-be-transferred asset belongs to the first user; the blockchain node is configured to: invoke a second smart contract in the blockchain, and generate a second possessing code based on the second smart contract; and receive the asset transfer verification information sent by the second client device 504, and if verification of the asset transfer verification information succeeds, send the second possessing code to the second client device 504 to represent that the to-be-transferred asset belongs to the second user; and the second client device 504 is configured to receive the second possessing code sent by the blockchain node.

According to the system for asset transfer provided in one or more embodiments of the present specification, when receiving the asset transfer request sent by the first client device, the blockchain node locks the to-be-transferred asset and sends the asset information of the to-be-transferred asset to the designated trading platform, so that the trading platform determines the second user who trades with the first user. When obtaining the asset transfer information from the first client device, the blockchain node transfers the locked to-be-transferred asset to the second user. Therefore, when receiving the asset transfer request, the blockchain node locks the to-be-transferred asset, thus effectively avoiding an on-chain operation of the to-be-transferred asset based on other transaction requests during off-chain transaction processing of the trading platform, that is, avoiding the problem that transactions of the same asset fail because the asset involves a plurality of transactions, and ensuring the effective operation of each transaction.

It is worthwhile to note that, the embodiments of the system for asset transfer in the present specification are based on the same inventive concept as the embodiments of the method for asset transfer in the present specification. Therefore, for specific implementation of the embodiments of the system for asset transfer, references can be made to the previous corresponding implementation of the method for asset transfer, and repeated parts are omitted for simplicity.

Figure 16:
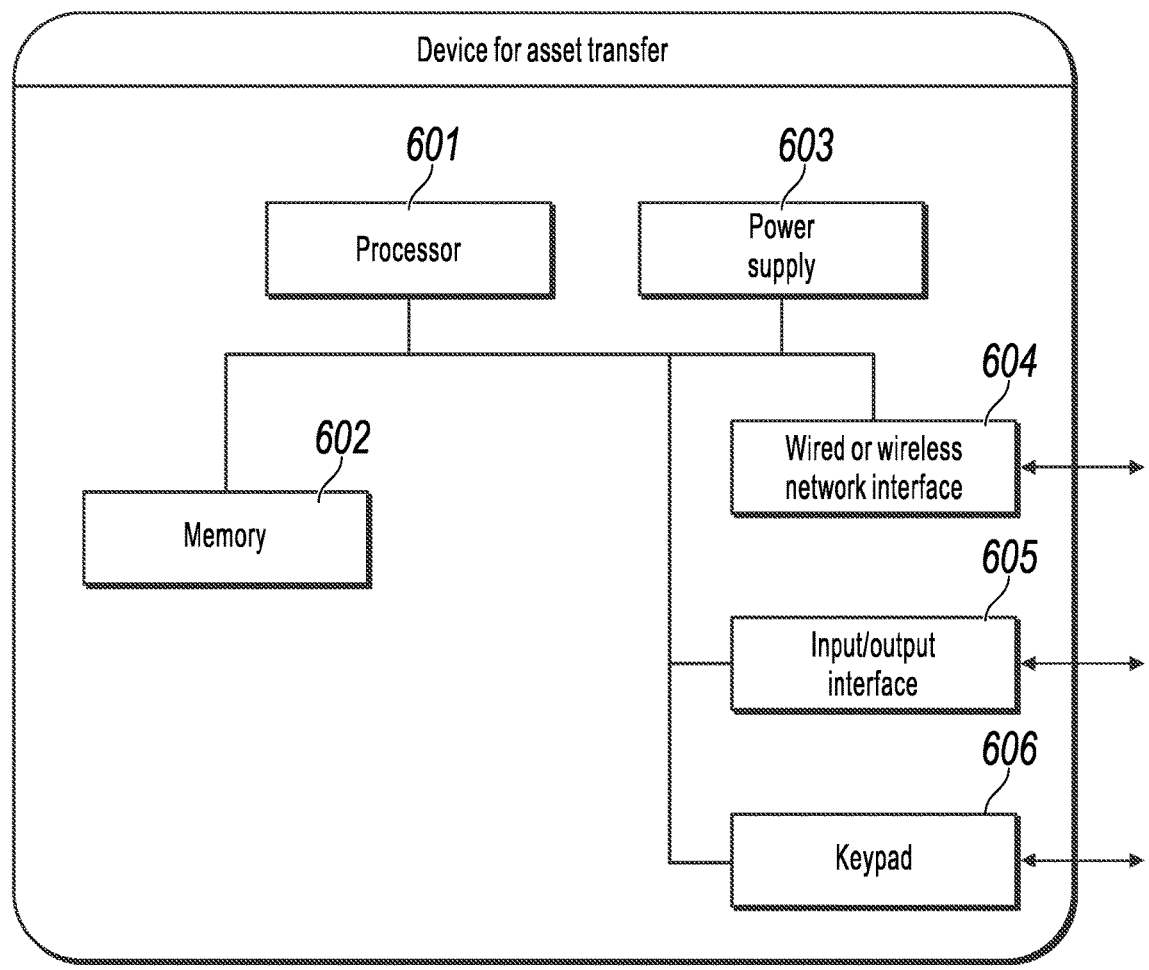
FIG. 16 is a schematic structural diagram illustrating a device for asset transfer, according to one or more embodiments of the present specification.

Further, corresponding to the method for asset transfer described previously, based on the same technical concept, one or more embodiments of the present specification further provide a device for asset transfer. The device is configured to perform the previous method for asset transfer. FIG. 16 is a schematic structural diagram illustrating a device for asset transfer, according to one or more embodiments of the present specification.

As shown in FIG. 16, the device for asset transfer can differ greatly because of a difference in configuration or performance, and can include one or more processors 601 and one or more memories 602. The memory 602 can store one or more applications or data. The memory 602 can be a temporary storage or a persistent storage. The application stored in the memory 602 can include one or more modules (not shown in the figure), and each module can include a series of computer-executable instructions in the device for asset transfer. Still further, the processor 601 can be configured to communicate with the memory 602 to execute a series of computer-executable instructions in the memory 602 on the device for asset transfer. The device for asset transfer can further include one or more power supplies 603, one or more wired or wireless network interfaces 604, one or more input/output interfaces 605, one or more keypads 606, etc.

In some specific embodiments, the device for asset transfer includes a memory and one or more programs, where the one or more programs are stored in the memory, and the one or more programs can include one or more modules, and each module can include a series of computer-executable instructions in the device for asset transfer. One or more processors are configured to execute the computer-executable instructions included in the one or more programs to perform the following operations: receiving an asset transfer request sent by a first client device, where the asset transfer request is sent based on an asset transfer operation of a first user, and the asset transfer request includes asset transfer information; invoking a first smart contract in a blockchain, and locking a to-be-transferred asset based on the first smart contract and the asset transfer information; sending asset information of the to-be-transferred asset to a designated trading platform, so that the trading platform determines, based on the asset information, a second user who trades with the first user; and obtaining asset transfer confirmation information from the first client device, and performing transfer processing on the locked to-be-transferred asset based on the asset transfer confirmation information, so as to transfer the to-be-transferred asset to the second user, where the asset transfer confirmation information includes information about the second user.

When receiving the asset transfer request sent by the first client device, the device for asset transfer provided in one or more embodiments of the present specification locks the to-be-transferred asset and sends the asset information of the to-be-transferred asset to the designated trading platform, so that the trading platform determines the second user who trades with the first user. When obtaining the asset transfer information from the first client device, the device for asset transfer transfers the locked to-be-transferred asset to the second user. Therefore, when the asset transfer request is received, the to-be-transferred asset is locked, thus effectively avoiding an on-chain operation of the to-be-transferred asset based on other transaction requests during off-chain transaction processing of the trading platform, that is, avoiding the problem that transactions of the same asset fail because the asset involves a plurality of transactions, and ensuring the effective operation of each transaction.

Optionally, when the computer-executable instructions are executed, the asset transfer information includes first identification information of the to-be-transferred asset; and the obtaining asset transfer confirmation information from the first client device includes the following: obtaining a first possessing code of the first user regarding the to-be-transferred asset and a first public key corresponding to the first possessing code from the blockchain based on the first identification information, where the first possessing code represents that the to-be-transferred asset belongs to the first user; encrypting the first possessing code based on the first public key to obtain a ciphertext of the first possessing code; sending the ciphertext of the first possessing code to the first client device, so that the first client device decrypts the ciphertext of the first possessing code based on a first private key corresponding to the first public key to obtain the first possessing code, and generating the asset transfer confirmation information based on the first possessing code; and receiving the asset transfer confirmation information sent by the first client device.

Optionally, when the computer-executable instructions are executed, the performing transfer processing on the locked to-be-transferred asset based on the asset transfer confirmation information includes the following: invoking a second smart contract in the blockchain, and generating a second possessing code based on the second smart contract; and receiving asset transfer verification information sent by the second client device, where the asset transfer verification information is generated based on the obtained first possessing code; and if verification of the asset transfer verification information succeeds, sending the second possessing code to the second client device to represent that the to-be-transferred asset belongs to the second user.

Optionally, when the computer-executable instructions are executed, the asset transfer confirmation information further includes the following: the first identification information, and first signature data obtained by signing the first possessing code based on the first private key; and the generating a second possessing code based on the second smart contract includes the following: obtaining the corresponding first public key from the blockchain based on the second smart contract and the first identification information; and if verification of the first signature data based on the first public key succeeds, generating the second possessing code.

Optionally, when the computer-executable instructions are executed, the asset transfer confirmation information further includes a second public key of the second user; the asset transfer verification information includes the following: the first identification information, and second signature data obtained by signing the first possessing code based on a second private key corresponding to the second public key; and after the generating a second possessing code based on the second smart contract, the following operation is further included: storing the second possessing code, the second public key, and the first identification information in association with the blockchain; and the verification of the asset transfer verification information succeeds, including the following: obtaining the second public key stored in association with the blockchain based on the first identification information in the asset transfer verification information; and if verification of the second signature data based on the second public key succeeds, determining that the verification of the asset transfer verification information succeeds.

Optionally, when the computer-executable instructions are executed, the asset transfer information includes first identification information of the to-be-transferred asset; and the locking a to-be-transferred asset based on the first smart contract and the asset transfer information includes the following: generating lock record information based on the first smart contract, the first identification information, and state information representing that the to-be-transferred asset is in a locked state; and storing the lock record information in the blockchain.

Optionally, when the computer-executable instructions are executed, after the performing transfer processing on the locked to-be-transferred asset based on the asset transfer confirmation information succeeds, the following operations are included: generating asset transfer success record information based on the asset transfer information; and storing the asset transfer success record information in the blockchain.

When receiving the asset transfer request sent by the first client device, the device for asset transfer provided in one or more embodiments of the present specification locks the to-be-transferred asset and sends the asset information of the to-be-transferred asset to the designated trading platform, so that the trading platform determines the second user who trades with the first user. When obtaining the asset transfer information from the first client device, the device for asset transfer transfers the locked to-be-transferred asset to the second user. Therefore, when the asset transfer request is received, the to-be-transferred asset is locked, thus effectively avoiding an on-chain operation of the to-be-transferred asset based on other transaction requests during off-chain transaction processing of the trading platform, that is, avoiding the problem that transactions of the same asset fail because the asset involves a plurality of transactions, and ensuring the effective operation of each transaction.

In some other specific embodiments, the device for asset transfer includes a memory and one or more programs, where the one or more programs are stored in the memory, and the one or more programs can include one or more modules, and each module can include a series of computer-executable instructions in the device for asset transfer. One or more processors are configured to execute the computer-executable instructions included in the one or more programs to perform the following operations: sending an asset transfer request to a blockchain node in response to an asset transfer operation of a first user, so that the blockchain node locks a to-be-transferred asset based on asset transfer information included in the asset transfer request; and sending asset information of the to-be-transferred asset to a designated trading platform, so that the trading platform determines, based on the asset information, a second user who trades with the first user; and sending asset transfer confirmation information to the blockchain node based on information about the second user, so that the blockchain node performs transfer processing on the locked to-be-transferred asset based on the asset transfer confirmation information, so as to transfer the to-be-transferred asset to the second user.

The device for asset transfer provided in one or more embodiments of the present specification sends the asset transfer request to the blockchain node based on the asset transfer operation of the first user, so that the blockchain node locks the to-be-transferred asset based on the asset transfer request; and the device for asset transfer sends the asset transfer confirmation information to the blockchain node based on the information about the second user determined by the trading platform, so that the blockchain node transfers the to-be-transferred asset to the second user. Therefore, locking the to-be-transferred asset effectively prevents the blockchain node from performing an on-chain operation of the to-be-transferred asset based on other transaction requests during off-chain transaction processing of the trading platform, that is, avoids the problem that transactions of the same asset fail because the asset involves a plurality of transactions, and ensures the effective operation of each transaction.

Optionally, when the computer-executable instructions are executed, the sending asset transfer confirmation information to the blockchain node based on information about the second user includes the following: receiving a ciphertext of a first possessing code sent by the blockchain node, where the ciphertext of the first possessing code is obtained by the blockchain node by encrypting the first possessing code based on a first public key of the first user; the first possessing code represents that the to-be-transferred asset belongs to the first user; decrypting the ciphertext of the first possessing code based on a first private key corresponding to the first public key to obtain the first possessing code; displaying the obtained first possessing code, so that the first user performs an asset transfer confirmation operation when verification of the first possessing code succeeds; generating the asset transfer confirmation information based on the first possessing code and the information about the second user in response to the asset transfer confirmation operation of the first user; and sending the asset transfer confirmation information to the blockchain node.

Optionally, when the computer-executable instructions are executed, the generating the asset transfer confirmation information based on the first possessing code and the information about the second user includes the following: signing the first possessing code based on the first private key to obtain first signature data; and generating the asset transfer confirmation information based on first identification information of the to-be-transferred asset, the first signature data, and obtained second public key of the second user.

The device for asset transfer provided in one or more embodiments of the present specification sends the asset transfer request to the blockchain node based on the asset transfer operation of the first user, so that the blockchain node locks the to-be-transferred asset based on the asset transfer request; and the device for asset transfer sends the asset transfer confirmation information to the blockchain node based on the information about the second user determined by the trading platform, so that the blockchain node transfers the to-be-transferred asset to the second user. Therefore, locking the to-be-transferred asset effectively prevents the blockchain node from performing an on-chain operation of the to-be-transferred asset based on other transaction requests during off-chain transaction processing of the trading platform, that is, avoids the problem that transactions of the same asset fail because the asset involves a plurality of transactions, and ensures the effective operation of each transaction.

It is worthwhile to note that, the embodiments of the device for asset transfer in the present specification are based on the same inventive concept as the embodiments of the method for asset transfer in the present specification. Therefore, for specific implementation of the embodiments of the device for asset transfer, references can be made to the previous corresponding implementation of the method for asset transfer, and repeated parts are omitted for simplicity.

Further, corresponding to the method for asset transfer described previously, based on the same technical concept, one or more embodiments of the present specification further provide a storage medium, configured to store a computer-executable instruction; in some specific embodiments, the storage medium can be a USB flash drive, an optical disc, a hard disk, etc., and the computer-executable instruction stored in the storage medium can be executed by a processor to implement the following procedure: receiving an asset transfer request sent by a first client device, where the asset transfer request is sent based on an asset transfer operation of a first user, and the asset transfer request includes asset transfer information; invoking a first smart contract in a blockchain, and locking a to-be-transferred asset based on the first smart contract and the asset transfer information; sending asset information of the to-be-transferred asset to a designated trading platform, so that the trading platform determines, based on the asset information, a second user who trades with the first user; and obtaining asset transfer confirmation information from the first client device, and performing transfer processing on the locked to-be-transferred asset based on the asset transfer confirmation information, so as to transfer the to-be-transferred asset to the second user, where the asset transfer confirmation information includes information about the second user.

When the computer-executable instruction stored in the storage medium provided in one or more embodiments of the present specification is executed by the processor, and when the asset transfer request sent by the first client device is received, the to-be-transferred asset is locked and the asset information of the to-be-transferred asset is sent to the designated trading platform, so that the trading platform determines the second user who trades with the first user. When the asset transfer information is obtained from the first client device, the locked to-be-transferred asset is transferred to the second user. Therefore, when the asset transfer request is received, the to-be-transferred asset is locked, thus effectively avoiding an on-chain operation of the to-be-transferred asset based on other transaction requests during off-chain transaction processing of the trading platform, that is, avoiding the problem that transactions of the same asset fail because the asset involves a plurality of transactions, and ensuring the effective operation of each transaction.

Optionally, when the computer-executable instruction stored in the storage medium is executed by the processor, the asset transfer information includes first identification information of the to-be-transferred asset; and the obtaining asset transfer confirmation information from the first client device includes the following: obtaining a first possessing code of the first user regarding the to-be-transferred asset and a first public key corresponding to the first possessing code from the blockchain based on the first identification information, where the first possessing code represents that the to-be-transferred asset belongs to the first user; encrypting the first possessing code based on the first public key to obtain a ciphertext of the first possessing code; sending the ciphertext of the first possessing code to the first client device, so that the first client device decrypts the ciphertext of the first possessing code based on a first private key corresponding to the first public key to obtain the first possessing code, and generating the asset transfer confirmation information based on the first possessing code; and receiving the asset transfer confirmation information sent by the first client device.

Optionally, when the computer-executable instruction stored in the storage medium is executed by the processor, the performing transfer processing on the locked to-be-transferred asset based on the asset transfer confirmation information includes the following: invoking a second smart contract in the blockchain, and generating a second possessing code based on the second smart contract; and receiving asset transfer verification information sent by the second client device, where the asset transfer verification information is generated based on the obtained first possessing code; and if verification of the asset transfer verification information succeeds, sending the second possessing code to the second client device to represent that the to-be-transferred asset belongs to the second user.

Optionally, when the computer-executable instruction stored in the storage medium is executed by the processor, the asset transfer confirmation information further includes the following: the first identification information, and first signature data obtained by signing the first possessing code based on the first private key; and the generating a second possessing code based on the second smart contract includes the following: obtaining the corresponding first public key from the blockchain based on the second smart contract and the first identification information; and if verification of the first signature data based on the first public key succeeds, generating the second possessing code.

Optionally, when the computer-executable instruction stored in the storage medium is executed by the processor, the asset transfer confirmation information further includes a second public key of the second user; the asset transfer verification information includes the following: the first identification information, and second signature data obtained by signing the first possessing code based on a second private key corresponding to the second public key; and after the generating a second possessing code based on the second smart contract, the following operation is further included: storing the second possessing code, the second public key, and the first identification information in association with the blockchain; and the verification of the asset transfer verification information succeeds, including the following: obtaining the second public key stored in association with the blockchain based on the first identification information in the asset transfer verification information; and if verification of the second signature data based on the second public key succeeds, determining that the verification of the asset transfer verification information succeeds.

Optionally, when the computer-executable instruction stored in the storage medium is executed by the processor, the asset transfer information includes first identification information of the to-be-transferred asset; and the locking a to-be-transferred asset based on the first smart contract and the asset transfer information includes the following: generating lock record information based on the first smart contract, the first identification information, and state information representing that the to-be-transferred asset is in a locked state; and storing the lock record information in the blockchain.

Optionally, when the computer-executable instruction stored in the storage medium is executed by the processor, after the performing transfer processing on the locked to-be-transferred asset based on the asset transfer confirmation information succeeds, the following operations are included: generating asset transfer success record information based on the asset transfer information; and storing the asset transfer success record information in the blockchain.

When the computer-executable instruction stored in the storage medium provided in one or more embodiments of the present specification is executed by the processor, and when the asset transfer request sent by the first client device is received, the to-be-transferred asset is locked and the asset information of the to-be-transferred asset is sent to the designated trading platform, so that the trading platform determines the second user who trades with the first user. When the asset transfer information is obtained from the first client device, the locked to-be-transferred asset is transferred to the second user. Therefore, when the asset transfer request is received, the to-be-transferred asset is locked, thus effectively avoiding an on-chain operation of the to-be-transferred asset based on other transaction requests during off-chain transaction processing of the trading platform, that is, avoiding the problem that transactions of the same asset fail because the asset involves a plurality of transactions, and ensuring the effective operation of each transaction.

In some other specific embodiments, the storage medium can be a USB flash drive, an optical disc, a hard disk, etc., and the computer-executable instruction stored in the storage medium can be executed by a processor to implement the following procedure: sending an asset transfer request to a blockchain node in response to an asset transfer operation of a first user, so that the blockchain node locks a to-be-transferred asset based on asset transfer information included in the asset transfer request; and sending asset information of the to-be-transferred asset to a designated trading platform, so that the trading platform determines, based on the asset information, a second user who trades with the first user; and sending asset transfer confirmation information to the blockchain node based on information about the second user, so that the blockchain node performs transfer processing on the locked to-be-transferred asset based on the asset transfer confirmation information, so as to transfer the to-be-transferred asset to the second user.

When the computer-executable instruction stored in the storage medium provided in one or more embodiments of the present specification is executed by the processor, the asset transfer request is sent to the blockchain node based on the asset transfer operation of the first user, so that the blockchain node locks the to-be-transferred asset based on the asset transfer request; and the asset transfer confirmation information is sent to the blockchain node based on the information about the second user determined by the trading platform, so that the blockchain node transfers the to-be-transferred asset to the second user. Therefore, locking the to-be-transferred asset effectively prevents the blockchain node from performing an on-chain operation of the to-be-transferred asset based on other transaction requests during off-chain transaction processing of the trading platform, that is, avoids the problem that transactions of the same asset fail because the asset involves a plurality of transactions, and ensures the effective operation of each transaction.

Optionally, when the computer-executable instruction stored in the storage medium is executed by the processor, the sending asset transfer confirmation information to the blockchain node based on information about the second user includes the following: receiving a ciphertext of a first possessing code sent by the blockchain node, where the ciphertext of the first possessing code is obtained by the blockchain node by encrypting the first possessing code based on a first public key of the first user; the first possessing code represents that the to-be-transferred asset belongs to the first user; decrypting the ciphertext of the first possessing code based on a first private key corresponding to the first public key to obtain the first possessing code; displaying the obtained first possessing code, so that the first user performs an asset transfer confirmation operation when verification of the first possessing code succeeds; generating the asset transfer confirmation information based on the first possessing code and the information about the second user in response to the asset transfer confirmation operation of the first user; and sending the asset transfer confirmation information to the blockchain node.

Optionally, when the computer-executable instruction stored in the storage medium is executed by the processor, the generating the asset transfer confirmation information based on the first possessing code and the information about the second user includes the following: signing the first possessing code based on the first private key to obtain first signature data; and generating the asset transfer confirmation information based on first identification information of the to-be-transferred asset, the first signature data, and obtained second public key of the second user.

When the computer-executable instruction stored in the storage medium provided in one or more embodiments of the present specification is executed by the processor, the asset transfer request is sent to the blockchain node based on the asset transfer operation of the first user, so that the blockchain node locks the to-be-transferred asset based on the asset transfer request; and the asset transfer confirmation information is sent to the blockchain node based on the information about the second user determined by the trading platform, so that the blockchain node transfers the to-be-transferred asset to the second user. Therefore, locking the to-be-transferred asset effectively prevents the blockchain node from performing an on-chain operation of the to-be-transferred asset based on other transaction requests during off-chain transaction processing of the trading platform, that is, avoids the problem that transactions of the same asset fail because the asset involves a plurality of transactions, and ensures the effective operation of each transaction.

It is worthwhile to note that, the embodiments of the storage medium in the present specification are based on the same inventive concept as the embodiments of the method for asset transfer in the present specification. Therefore, for specific implementation of the embodiments of the storage medium, references can be made to the previous corresponding implementation of the method for asset transfer, and repeated parts are omitted for simplicity.

The specific embodiments of the present specification are described previously. Other embodiments fall within the scope of the appended claims. In some situations, the actions or steps described in the claims can be performed in an order different from the order in the embodiments and the desired results can still be achieved. In addition, the process depicted in the accompanying drawings does not necessarily need a particular execution order to achieve the desired results. In some implementations, multi-tasking and concurrent processing are feasible or may be advantageous.

In the 1990s, whether a technical improvement is a hardware improvement (for example, an improvement to a circuit structure, such as a diode, a transistor, or a switch) or a software improvement (an improvement to a method procedure) can be clearly distinguished. However, as technologies develop, current improvements to many method procedures can be considered as direct improvements to hardware circuit structures. A designer usually programs an improved method procedure into a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the programmable logic device is determined by a user through device programming. The designer performs programming to "integrate" a digital system to a PLD without requesting a chip manufacturer to design and produce an application-specific integrated circuit chip. In addition, at present, instead of manually manufacturing an integrated chip, this type of programming is mostly implemented by using "logic compiler" software. The programming is similar to a software compiler used to develop and write a program. Original code needs to be written in a particular programming language for compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The very-high-speed integrated circuit hardware description language (VHDL) and Verilog are most commonly used. A person skilled in the art should also understand that a hardware circuit that implements a logical method procedure can be readily obtained once the method procedure is logically programmed by using the several described hardware description languages and is programmed into an integrated circuit.

A controller can be implemented by using any appropriate method. For example, the controller can be a microprocessor or a processor, or a computer-readable medium that stores computer-readable program code (such as software or firmware) that can be executed by the microprocessor or the processor, a logic gate, a switch, an application-specific integrated circuit (ASIC), a programmable logic controller, or a built-in microprocessor. Examples of the controller include but are not limited to the following microprocessors: ARC 625D, Atmel AT91SAM, Microchip PIC18F26K20, and Silicone Labs C8051F320. The memory controller can also be implemented as a part of the control logic of the memory. A person skilled in the art also knows that, in addition to implementing the controller by using the computer-readable program code, logic programming can be performed on method steps to allow the controller to implement the same function in forms of the logic gate, the switch, the application-specific integrated circuit, the programmable logic controller, and the built-in microcontroller. Therefore, the controller can be considered as a hardware component, and an apparatus configured to implement various functions in the controller can also be considered as a structure in the hardware component. Alternatively, the apparatus configured to implement various functions can even be considered as both a software module implementing the method and a structure in the hardware component.

The system, apparatus, module, or unit illustrated in the previous embodiments can be specifically implemented by using a computer chip or an entity, or can be implemented by using a product having a specific function. A typical implementation device is a computer. Specifically, for example, the computer can be a personal computer, a laptop computer, a cellular phone, a camera phone, a smart phone, a personal digital assistant, a media player, a navigation device, an e-mail device, a game console, a tablet computer, a wearable device, or any combination of these devices.

For ease of description, the previous apparatus is described by dividing functions into various units. Certainly, when the present specification is implemented, a function of each unit can be implemented in one or more pieces of software and/or hardware.

A person skilled in the art should understand that one or more embodiments of the present specification can be provided as a method, a system, or a computer program product. Therefore, one or more embodiments of the present specification can take the form of hardware only embodiments, software only embodiments, or embodiments with a combination of software and hardware. Moreover, the present specification can use a form of a computer program product that is implemented on one or more computer-usable storage media (including but not limited to a disk memory, a CD-ROM, an optical memory, etc.) that include computer-usable program code.

The present specification is described with reference to the flowcharts and/or block diagrams of the method, the device (system), and the computer program product based on the embodiments of the present specification. It is worthwhile to note that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so the instructions executed by the computer or the processor of the another programmable data processing device generate an apparatus for implementing a specific function in one or more processes in the flowcharts and/or in one or more blocks in the block diagrams.

These computer program instructions can be stored in a computer-readable memory that can instruct the computer or the another programmable data processing device to work in a specific way, so the instructions stored in the computer-readable memory generate an artifact that includes an instruction apparatus. The instruction apparatus implements a specific function in one or more processes in the flowcharts and/or in one or more blocks in the block diagrams.

These computer program instructions can be loaded onto the computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, a computing device includes one or more processors (CPUs), one or more input/output interfaces, one or more network interfaces, and one or more memories.

The memory can include a non-persistent memory, a random access memory (RAM), a non-volatile memory, and/or another form that are in a computer-readable medium, for example, a read-only memory (ROM) or a flash memory (flash RAM). The memory is an example of the computer-readable medium.

The computer-readable medium includes persistent, non-persistent, movable, and unmovable media that can store information by using any method or technology. Information can be a computer-readable instruction, a data structure, a program module or other data. Examples of the computer storage medium include but are not limited to a phase change random access memory (PRAM), a static random access memory (SRAM), a dynamic random access memory (DRAM), another type of RAM, a ROM, an electrically erasable programmable read-only memory (EEPROM), a flash memory or another memory technology, a compact disc read-only memory (CD-ROM), a digital versatile disc (DVD) or another optical storage, a cassette magnetic tape, a magnetic tape/magnetic disk storage, another magnetic storage device, or any other non-transmission medium. The computer storage medium can be configured to store information accessible by a computing device. Based on the definition in the present specification, the computer-readable medium does not include transitory media such as a modulated data signal and carrier.

It is worthwhile to further note that, the terms "include", "comprise", or their any other variants are intended to cover a non-exclusive inclusion, so a process, a method, a product or a device that includes a list of elements not only includes those elements but also includes other elements which are not expressly listed, or further includes elements inherent to such process, method, product or device. Without more constraints, an element preceded by "includes a . . . " does not preclude the existence of additional identical elements in the process, method, product or device that includes the element.

One or more embodiments of the present specification can be described in the general context of computer-executable instructions, for example, a program module. Generally, the program module includes a routine, a program, an object, a component, a data structure, etc. executing a specific task or implementing a specific abstract data type. One or more embodiments of the present specification can alternatively be practiced in distributed computing environments in which tasks are performed by remote processing devices that are connected through a communications network. In a distributed computing environment, the program module can be located in both local and remote computer storage media including storage devices.

The embodiments in the present specification are described in a progressive way. For same or similar parts of the embodiments, mutual references can be made to the embodiments. Each embodiment focuses on a difference from other embodiments. Particularly, a system embodiment is basically similar to a method embodiment, and therefore is described briefly. For related parts, references can be made to related descriptions in the method embodiment.

The previous descriptions are merely embodiments of the present specification, and are not intended to limit the present specification. A person skilled in the art can make various modifications and changes to the present specification. Any modification, equivalent replacement, or improvement made without departing from the spirit and principle of the present specification shall fall within the scope of the claims in the present specification.

The invention claimed is:

1. A method for asset transfer, performed by a blockchain node, comprising:
receiving an asset transfer request sent by a first client device, wherein the asset transfer request is sent based on an asset transfer operation of a first user, and the asset transfer request comprises asset transfer information;
invoking a first smart contract in a blockchain;
locking a to-be-transferred asset based on the first smart contract and the asset transfer information, the locking the to-be-transferred asset resulting in a locked to-be-transferred asset;
sending asset information of the locked to-be-transferred asset to a designated trading platform that determines, based on the asset information, a second user who trades with the first user; and
obtaining asset transfer confirmation information from the first client device; and
performing transfer processing on the locked to-be-transferred asset based on the asset transfer confirmation information to transfer the to-be-transferred asset to the second user, wherein the asset transfer confirmation information comprises information about the second user;
wherein the asset transfer information comprises first identification information of the to-be-transferred asset; and
the obtaining asset transfer confirmation information from the first client device comprises:
obtaining a first possessing code of the first user regarding the to-be-transferred asset and a first public key corresponding to the first possessing code from the blockchain based on the first identification information, wherein the first possessing code represents that the to-be-transferred asset belongs to the first user;
encrypting the first possessing code based on the first public key to obtain a ciphertext of the first possessing code;

sending the ciphertext of the first possessing code to the first client device, wherein the first client device decrypts the ciphertext of the first possessing code based on a first private key corresponding to the first public key to obtain the first possessing code, and generates the asset transfer confirmation information based on the first possessing code; and receiving the asset transfer confirmation information sent by the first client device.

2. The method according to claim 1, wherein the performing transfer processing on the locked to-be-transferred asset based on the asset transfer confirmation information comprises:

invoking a second smart contract in the blockchain;
generating a second possessing code based on the second smart contract; and
receiving asset transfer verification information sent by a second client device, wherein the asset transfer verification information is generated based on the first possessing code; and
if verification of the asset transfer verification information succeeds, sending the second possessing code to the second client device to represent that the to-be-transferred asset belongs to the second user.

3. The method according to claim 2, wherein the asset transfer confirmation information further comprises the first identification information, and first signature data obtained by signing the first possessing code based on the first private key; and the generating a second possessing code based on the second smart contract comprises:
obtaining the corresponding first public key from the blockchain based on the second smart contract and the first identification information; and
if verification of the first signature data based on the first public key succeeds, generating the second possessing code.

4. The method according to claim 2, wherein:

the asset transfer confirmation information further comprises a second public key of the second user;
the asset transfer verification information comprises: the first identification information, and second signature data obtained by signing the first possessing code based on a second private key corresponding to the second public key; and
after the generating a second possessing code based on the second smart contract, the method further comprises:
storing the second possessing code, the second public key, and the first identification information in association with the blockchain; and
the verification of the asset transfer verification information succeeds comprises:
obtaining the second public key stored in association with the blockchain based on the first identification information in the asset transfer verification information; and
if verification of the second signature data based on the second public key succeeds, determining that the verification of the asset transfer verification information succeeds.

5. The method according to claim 1, wherein the asset transfer information comprises first identification information of the to-be-transferred asset; and the locking a to-be-transferred asset based on the first smart contract and the asset transfer information comprises:

generating lock record information based on the first smart contract, the first identification information, and state information representing that the to-be-transferred asset is in a locked state; and
storing the lock record information in the blockchain.

6. The method according to claim 1, further comprising:

after the performing transfer processing on the locked to-be-transferred asset based on the asset transfer confirmation information succeeds, generating asset transfer success record information based on the asset transfer information; and
storing the asset transfer success record information in the blockchain.

7. A method for asset transfer, performed by a first client device, comprising:

sending an asset transfer request to a blockchain node in response to an asset transfer operation of a first user, so that the blockchain node locks a to-be-transferred asset based on asset transfer information comprised in the asset transfer request;
sending asset information of the to-be-transferred asset to a designated trading platform that determines, based on the asset information, a second user who trades with the first user; and
sending asset transfer confirmation information to the blockchain node based on information about the second user, wherein the blockchain node performs transfer processing on the locked to-be-transferred asset based on the asset transfer confirmation information, so as to transfer the to-be-transferred asset to the second user;
wherein the sending asset transfer confirmation information to the blockchain node based on information about the second user comprises:
receiving a ciphertext of a first possessing code sent by the blockchain node, wherein the ciphertext of the first possessing code is obtained by the blockchain node by encrypting the first possessing code based on a first public key of the first user, and the first possessing code represents that the to-be-transferred asset belongs to the first user;
decrypting the ciphertext of the first possessing code based on a first private key corresponding to the first public key to obtain the first possessing code;
displaying the first possessing code;
in response to the first user performing an asset transfer confirmation operation when verification of the first possessing code succeeds, generating the asset transfer confirmation information based on the first possessing code and the information about the second user in response to the asset transfer confirmation operation of the first user; and
sending the asset transfer confirmation information to the blockchain node.

8. The method according to claim 7, wherein the generating the asset transfer confirmation information based on the first possessing code and the information about the second user comprises:

signing the first possessing code based on the first private key to obtain first signature data; and
generating the asset transfer confirmation information based on first identification information of the to-be-transferred asset, the first signature data, and obtained second public key of the second user.

9. A system, comprising:
a processor; and
a memory storing a computer-executable instruction, wherein when executed by the processor, realize a blockchain node that performs the following operations:
receiving an asset transfer request sent by a first client device, wherein the asset transfer request is sent based on an asset transfer operation of a first user, and the asset transfer request comprises asset transfer information;
invoking a first smart contract in a blockchain;
   locking a to-be-transferred asset based on the first smart contract and the asset transfer information, the locking the to-be-transferred asset resulting in a locked to-be-transferred asset;
sending asset information of the locked to-be-transferred asset to a designated trading platform that determines, based on the asset information, a second user who trades with the first user; and
obtaining asset transfer confirmation information from the first client device; and
   performing transfer processing on the locked to-be-transferred asset based on the asset transfer confirmation information to transfer the to-be-transferred asset to the second user, wherein the asset transfer confirmation information comprises information about the second user;
wherein the asset transfer information comprises first identification information of the to-be-transferred asset; and
the obtaining asset transfer confirmation information from the first client device comprises:
   obtaining a first possessing code of the first user regarding the to-be-transferred asset and a first public key corresponding to the first possessing code from the blockchain based on the first identification information, wherein the first possessing code represents that the to-be-transferred asset belongs to the first user;
   encrypting the first possessing code based on the first public key to obtain a ciphertext of the first possessing code;
   sending the ciphertext of the first possessing code to the first client device, wherein the first client device decrypts the ciphertext of the first possessing code based on a first private key corresponding to the first public key to obtain the first possessing code, and generates the asset transfer confirmation information based on the first possessing code; and
   receiving the asset transfer confirmation information sent by the first client device.

10. The system of claim 9, wherein the performing transfer processing on the locked to-be-transferred asset based on the asset transfer confirmation information comprises:
invoking a second smart contract in the blockchain;
   generating a second possessing code based on the second smart contract; and
receiving asset transfer verification information sent by a second client device, wherein the asset transfer verification information is generated based on the first possessing code; and
if verification of the asset transfer verification information succeeds, sending the second possessing code to the second client device to represent that the to-be-transferred asset belongs to the second user.

11. The system of claim 10, wherein the asset transfer confirmation information further comprises the first identification information, and first signature data obtained by signing the first possessing code based on the first private key; and
   the generating a second possessing code based on the second smart contract comprises:
      obtaining the corresponding first public key from the blockchain based on the second smart contract and the first identification information; and
      if verification of the first signature data based on the first public key succeeds, generating the second possessing code.

12. The system of claim 11, wherein:
the asset transfer confirmation information further comprises a second public key of the second user;
the asset transfer verification information comprises: the first identification information, and second signature data obtained by signing the first possessing code based on a second private key corresponding to the second public key; and
after the generating a second possessing code based on the second smart contract, the system performs the operations of:
storing the second possessing code, the second public key, and the first identification information in association with the blockchain; and
the verification of the asset transfer verification information succeeds comprises:
   obtaining the second public key stored in association with the blockchain based on the first identification information in the asset transfer verification information; and
   if verification of the second signature data based on the second public key succeeds, determining that the verification of the asset transfer verification information succeeds.

13. The system of claim 9, the operation further comprising:
   after the performing transfer processing on the locked to-be-transferred asset based on the asset transfer confirmation information succeeds, generating asset transfer success record information based on the asset transfer information; and
   storing the asset transfer success record information in the blockchain.

14. A non-transitory memory storing a computer-executable instruction, wherein when executed by a computer, cause the computer to realize a blockchain node that performs the following operations:
receiving an asset transfer request sent by a first client device, wherein the asset transfer request is sent based on an asset transfer operation of a first user, and the asset transfer request comprises asset transfer information;
invoking a first smart contract in a blockchain;
   locking a to-be-transferred asset based on the first smart contract and the asset transfer information, the locking the to-be-transferred asset resulting in a locked to-be-transferred asset;
sending asset information of the locked to-be-transferred asset to a designated trading platform that determines, based on the asset information, a second user who trades with the first user; and
obtaining asset transfer confirmation information from the first client device; and performing transfer processing on the locked to-be-transferred asset based on the asset transfer confirmation information to transfer the to-be-transferred asset to the second user, wherein the asset transfer confirmation information comprises information about the second user;

wherein the asset transfer information comprises first identification information of the to-be-transferred asset; and the obtaining asset transfer confirmation information from the first client device comprises:
  obtaining a first possessing code of the first user regarding the to-be-transferred asset and a first public key corresponding to the first possessing code from the blockchain based on the first identification information, wherein the first possessing code represents that the to-be-transferred asset belongs to the first user;
  encrypting the first possessing code based on the first public key to obtain a ciphertext of the first possessing code;
  sending the ciphertext of the first possessing code to the first client device, wherein the first client device decrypts the ciphertext of the first possessing code based on a first private key corresponding to the first public key to obtain the first possessing code, and generates the asset transfer confirmation information based on the first possessing code; and
  receiving the asset transfer confirmation information sent by the first client device.

15. The non-transitory memory of claim 14, wherein the performing transfer processing on the locked to-be-transferred asset based on the asset transfer confirmation information comprises:
  invoking a second smart contract in the blockchain;
    generating a second possessing code based on the second smart contract; and
  receiving asset transfer verification information sent by a second client device, wherein the asset transfer verification information is generated based on the obtained first possessing code; and
  if verification of the asset transfer verification information succeeds, sending the second possessing code to the second client device to represent that the to-be-transferred asset belongs to the second user.

16. The non-transitory memory of claim 15, wherein the asset transfer confirmation information further comprises the first identification information, and first signature data obtained by signing the first possessing code based on the first private key; and
  the generating a second possessing code based on the second smart contract comprises:
    obtaining the corresponding first public key from the blockchain based on the second smart contract and the first identification information; and
    if verification of the first signature data based on the first public key succeeds, generating the second possessing code.

* * * * *